METHOD OF MAKING TAPERED DISK WHEEL

Original Filed Sept. 26, 1960 16 Sheets-Sheet 1

METHOD OF MAKING TAPERED DISK WHEEL

Original Filed Sept. 26, 1960

METHOD OF MAKING TAPERED DISK WHEEL

July 9, 1968 W. W. BULGRIN ET AL 3,391,439

METHOD OF MAKING TAPERED DISK WHEEL

Original Filed Sept. 26, 1960 16 Sheets-Sheet 7

July 9, 1968 W. W. BULGRIN ET AL 3,391,439

METHOD OF MAKING TAPERED DISK WHEEL

Original Filed Sept. 26, 1960 16 Sheets-Sheet 9

METHOD OF MAKING TAPERED DISK WHEEL

Original Filed Sept. 26, 1960 16 Sheets-Sheet 11

METHOD OF MAKING TAPERED DISK WHEEL

July 9, 1968 W. W. BULGRIN ET AL 3,391,439

METHOD OF MAKING TAPERED DISK WHEEL

Original Filed Sept. 26, 1960 16 Sheets-Sheet 13

METHOD OF MAKING TAPERED DISK WHEEL

United States Patent Office 3,391,439
Patented July 9, 1968

3,391,439

METHOD OF MAKING TAPERED DISK WHEEL

Walter W. Bulgrin, Akron, Ohio, and Gordon C. J. Parent, Southgate, Mich., assignor to The Firestone Tire & Rubber Company, Akron, Ohio, a corporation of Ohio Continuation of application Ser. No. 58,580, Sept. 26, 1960. This application June 29, 1966, Ser. No. 565,035
3 Claims. (Cl. 29—159.01)

ABSTRACT OF THE DISCLOSURE

A method of making a wheel disk having a curved bowl shape uniformly and gradually tapering from a relatively thick, flat hub to a relatively thin rim flange by the steps of cold spinning a flat circular axially perforate blank into a curved bowl of tapering thickness by axially displacing successive elements of the blank from the hub portion radially outwardly while maintaining the outer diameter of the blank constant and die-forming the spun bowl to provide a cylindrical rim flange and an annular shoulder between the rim flange and the hub.

This application is a continuation of our application Ser. No. 58,580, filed Sept. 26, 1960, now abandoned.

The invention relates to an improved continuous operation for producing disk wheels of conventional shape and cross section having optimum physical characteristics, and more particularly to a continuous wheel-making operation comprising a minimum number of steps.

Conventional disk wheels for automotive vehicles are generally bowl-shaped with a flat hub portion and a curved intermediate portion terminating in a cylindrical rim flange, and usually having an annular shoulder or nave therein. The cross sectional thickness tapers from the hub out to a relatively thin rim flange. The thin rim flange reduces weight at the periphery of the wheel while still providing adequate resiliency and impact strength. Hand holes are formed in the curved intermediate portion to provide spoke portions and further reduce weight and increase resiliency, and to provide access for inflating dual wheels.

Various methods have been practiced for producing such disk wheels, including a series of die-forming operations, a combination of extruding and die-forming operations, and a combination of hot or cold rolling a flat blank to taper it and then die-forming. In all of such methods of which we are aware, the metal is improperly stressed or inadequately worked to produce optimum physical characteristics in the final product.

The present invention contemplates making the disk wheel by cold spinning the curved bowl of tapering thickness from a flat blank without improperly stressing the metal, to obtain optimum physical characteristics requiring a minimum of die-forming to shape the disk into final form.

Certain prior attempts have been made to produce disk wheels by spinning, but in such cases the wheel was unduly stressed radially by the spinning operation itself or by forming operations before or after the spinning operation in order to produce the desired curved bowl shape of tapering thickness.

It is an object of the present invention to provide an improved method and apparatus for producing a disk wheel from a flat blank by spinning and die-forming operations which do not unduly stress the metal.

Another object is to provide an improved method and apparatus for continuously producing disk wheels in a minimum number of operations.

A further object is to produce an improved wheel disk of curved bowl shape with tapering thickness having optimum physical characteristics.

A still further object is to produce an improved wheel disk and rim assembly.

Other objects include the provision of improved blanking means, improved spinning means, improved die-forming and piercing means, improved disk and rim assembling means, and improved welding means, all cooperating to carry out the improved method of producing an improved disk wheel and rim and disk assembly.

These and ancillary objects are accomplished by the improved methods, apparatus and articles comprising the present invention, preferred embodiments of which are shown by way of example in the accompanying drawings and described in detail herein. Various modifications and changes in details of construction are comprehended within the scope of the invention defined in the appended claims.

In carrying out the invention, a flat circular disk is blanked, edge-machined, and then spun on a mandrel in such manner as to form curved bowl shape of tapering thickness by progressively displacing elements of the metal axially on a curved mandrel while maintaining the outer diameter of the disk constant, then die-forming the bowl into finished shape without unduly stressing the intermediate curved portion thereof, piercing the hand holes and hub bolt holes in the formed disk, press fitting the formed disk into a rim, and finally circumferentially welding the rim to the disk.

Figure 11:
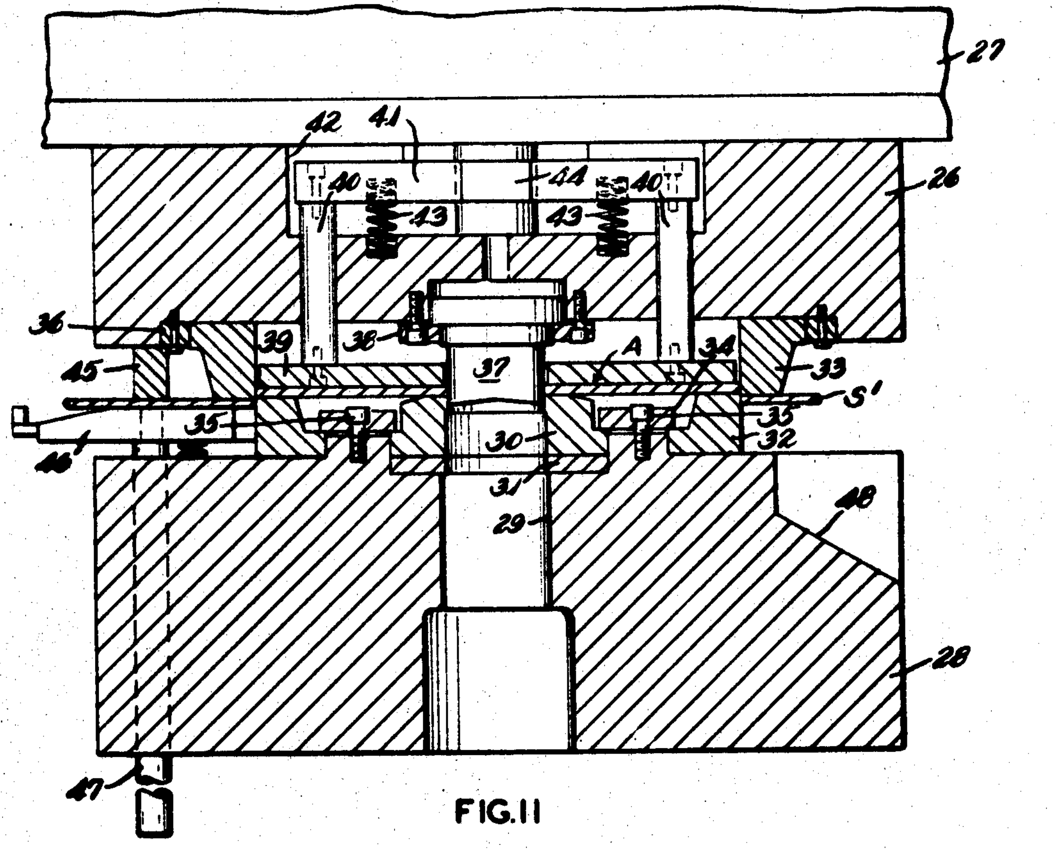
FIG. 11 is a cross sectional view of the improved blanking operation.
Figure 11A:
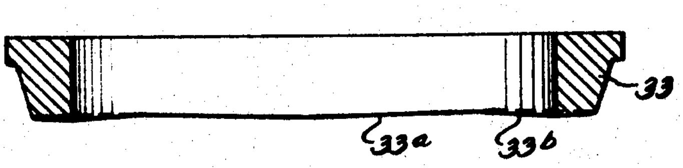

FIG. 11*a* is a detached cross secional view of the upper female die ring.

Figure 12:
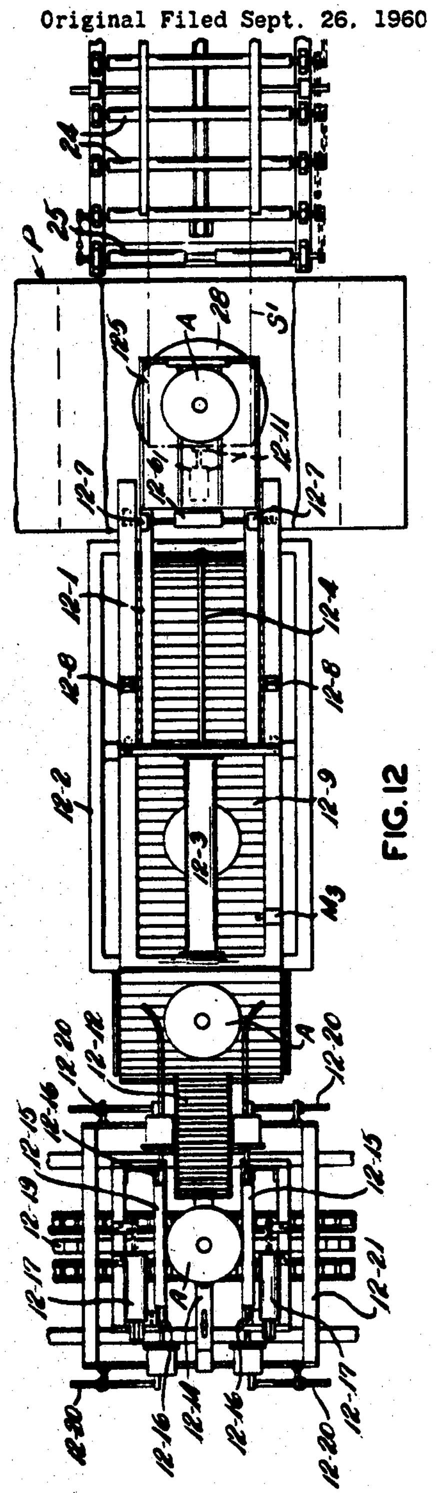

FIG. 12 is a schematic plan view of the mechanism for taking the blanks from the press and stacking them.

Figure 12A:
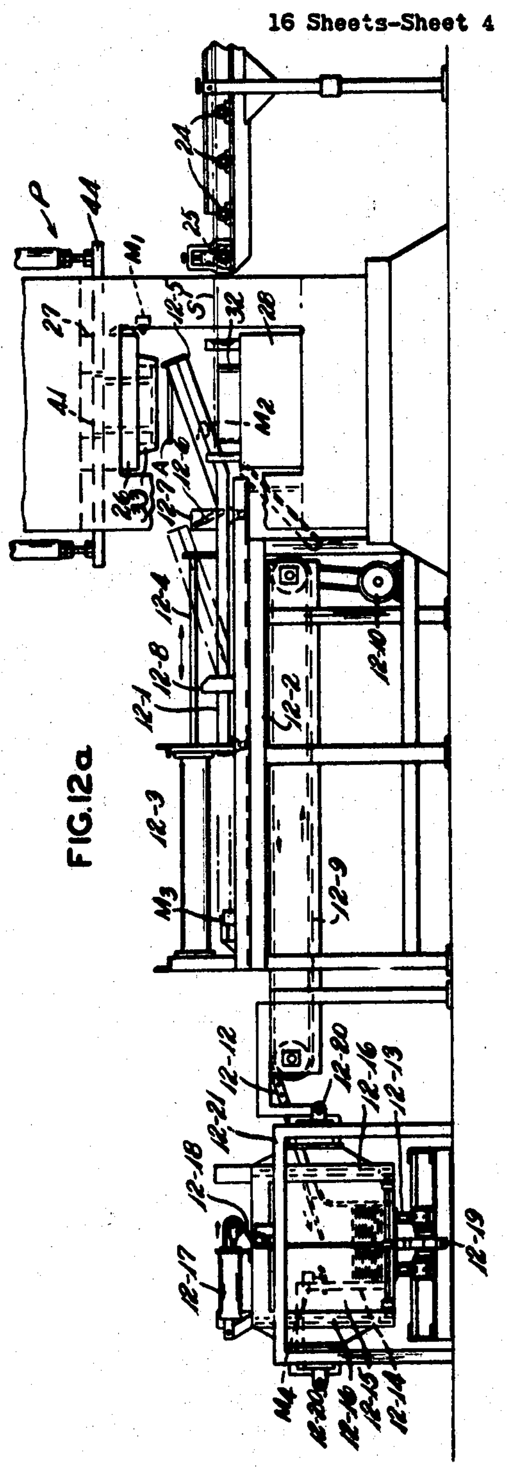

FIG. 12*a* is a side elevation thereof.

Figure 13:
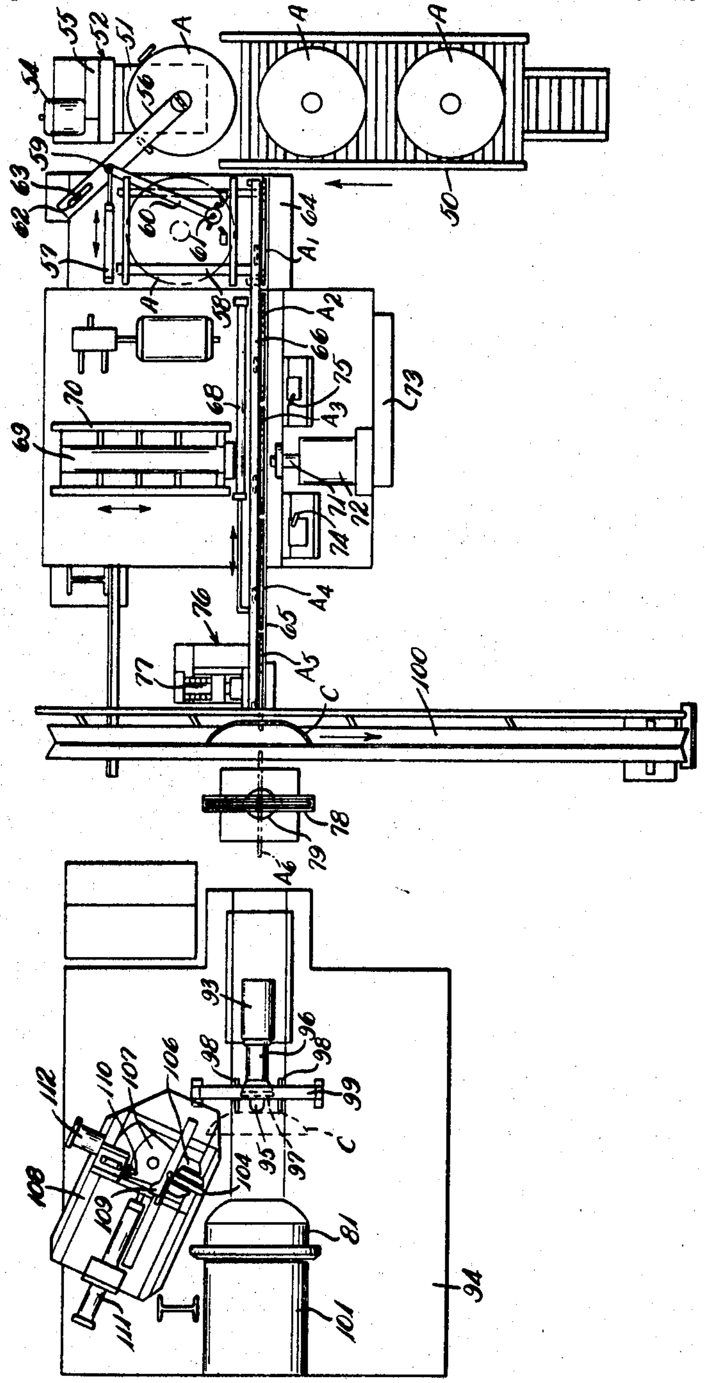

FIG. 13 is a schematic plan view of the improved spinning apparatus.

Figure 14:
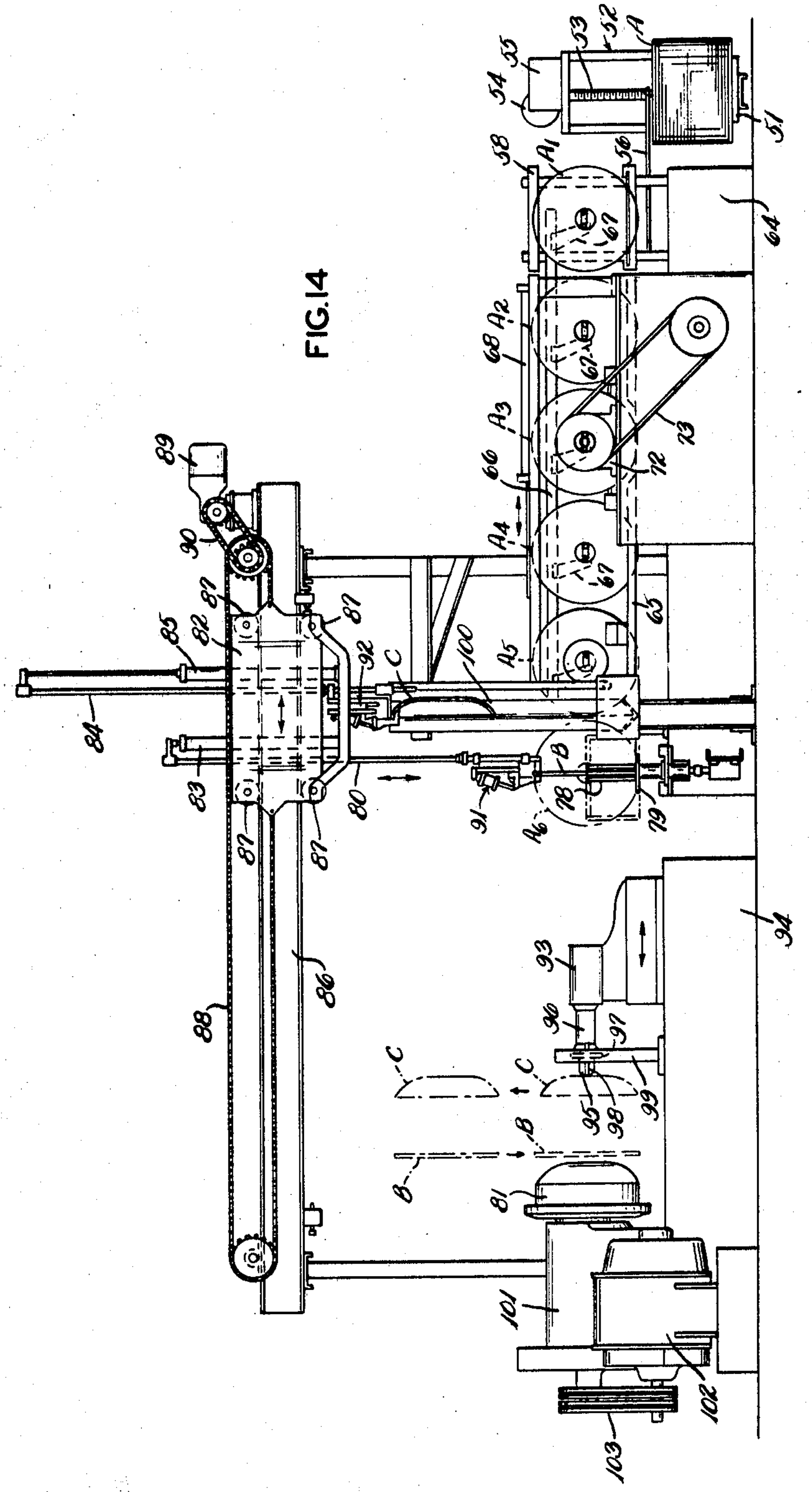

FIG. 14 is a front elevation thereof.

Figures 15, 16:
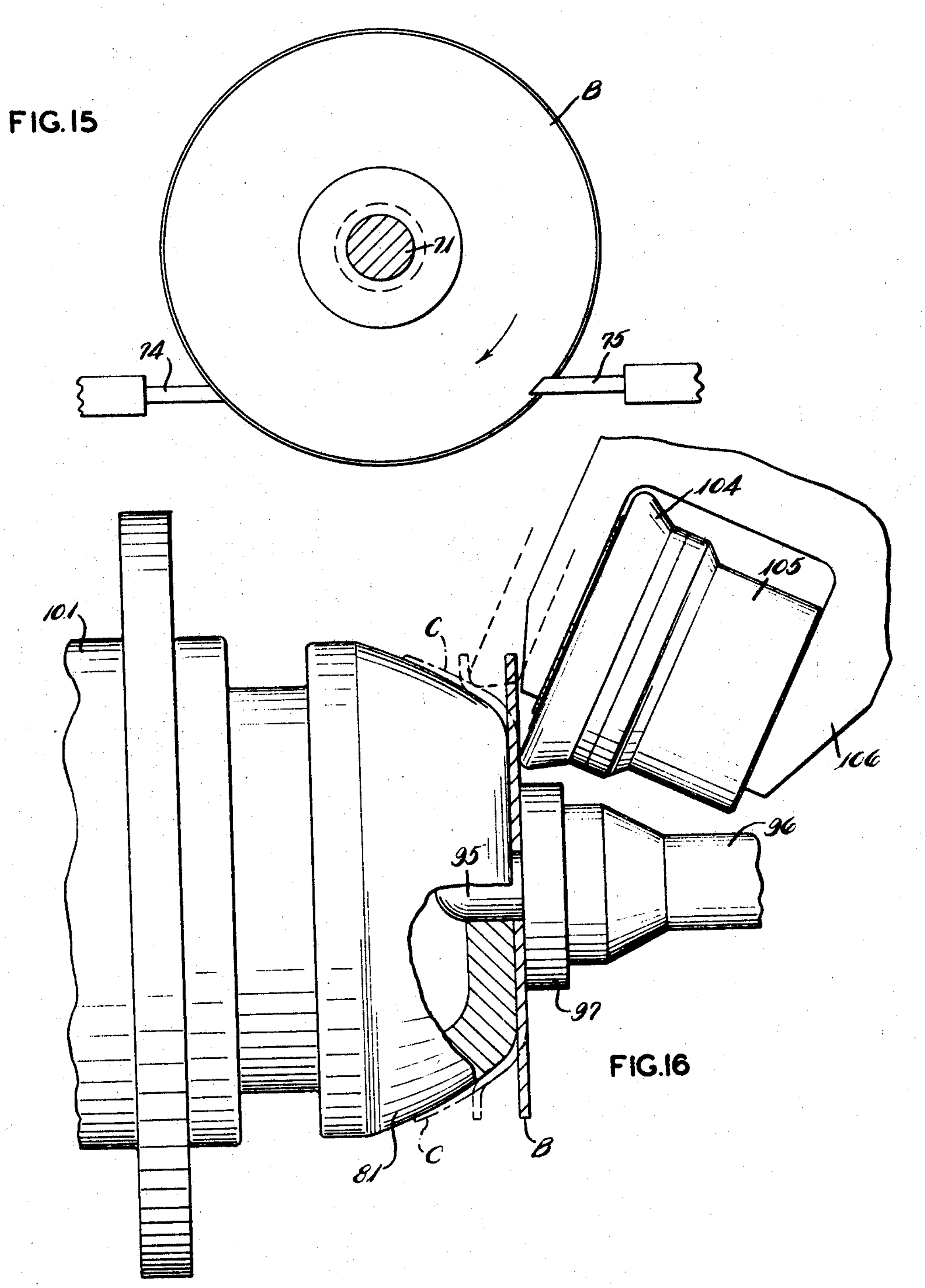

FIG. 15 is an enlarged schematic view showing the edge-turning and chamfering operations.

FIG. 16 is an enlarged elevational view, partly in section, showing the improved spinning operation.

Figure 17:
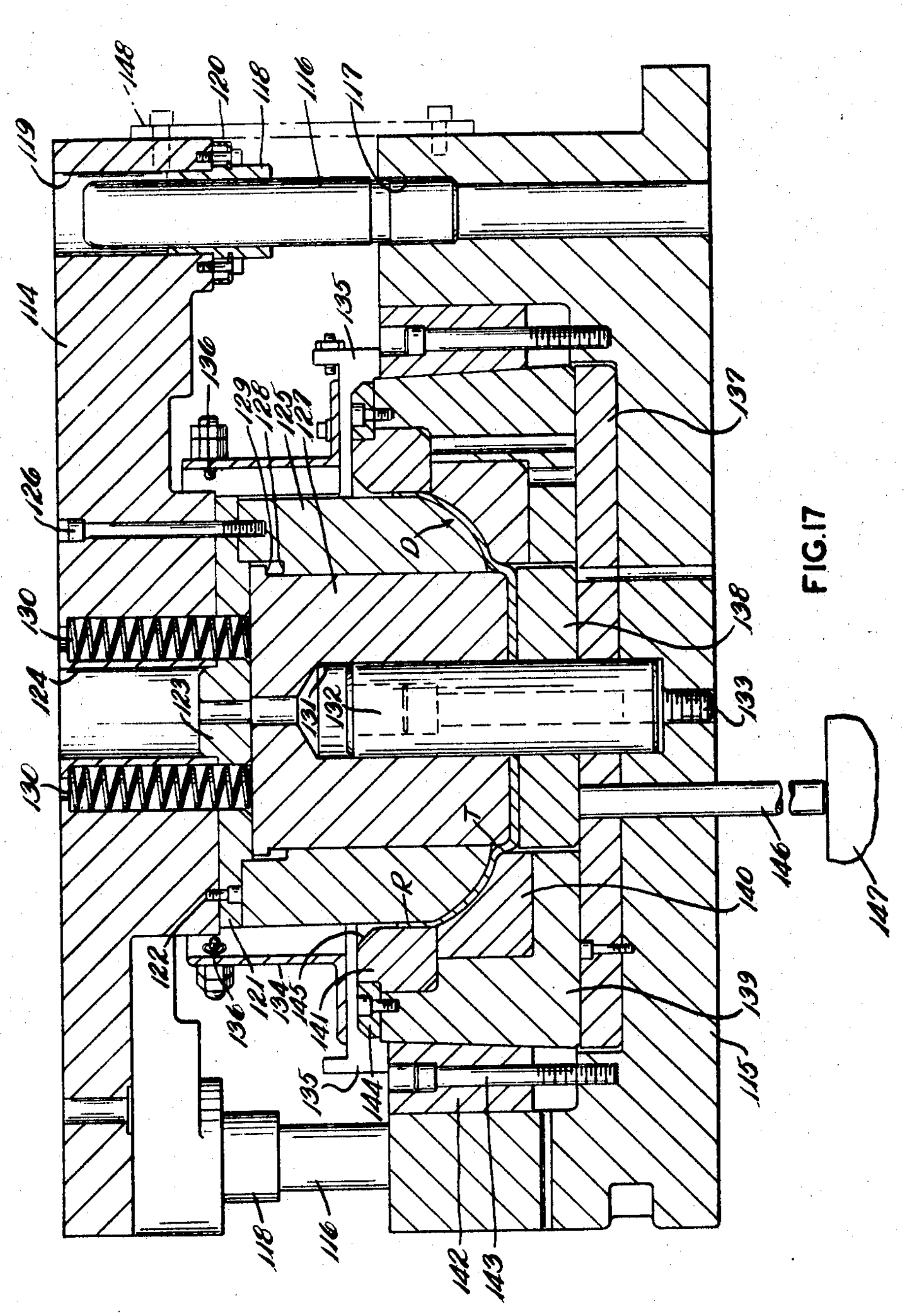

FIG. 17 is a cross sectional view showing the improved forming and restriking operation.

Figure 18:
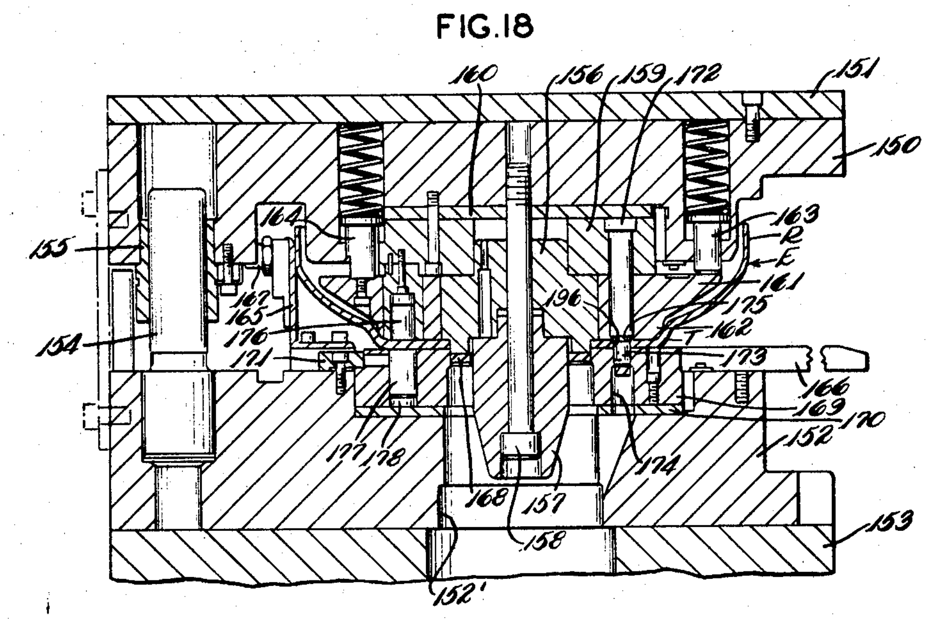

FIG. 18 is a reduced cross sectional view showing the improved bolt hole piercing operation.

Figure 19:
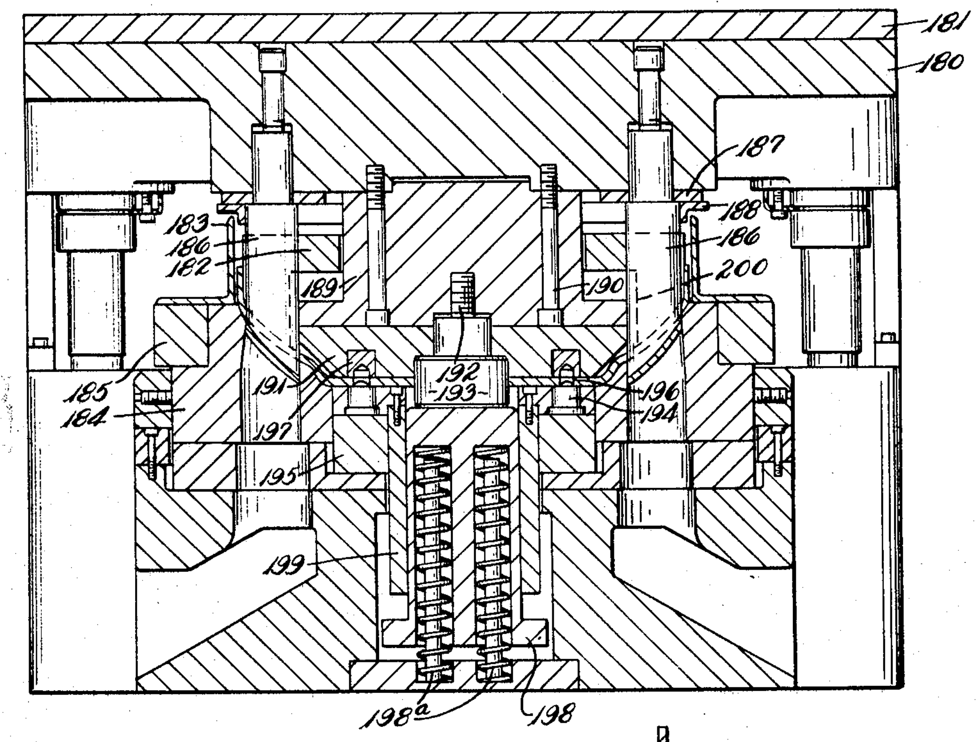

FIG. 19 is a cross sectional view showing the improved hand hole multiple piercing operation.

Figures 19A, 20A:
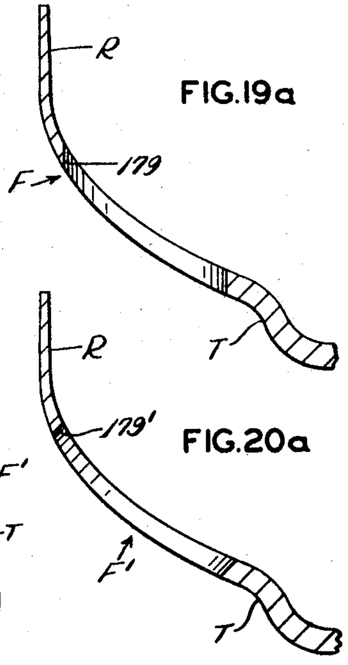

FIG. 19*a* is a detached fragmentary sectional view showing the type of hand holes pierced with the apparatus of FIG. 19.

Figure 20:
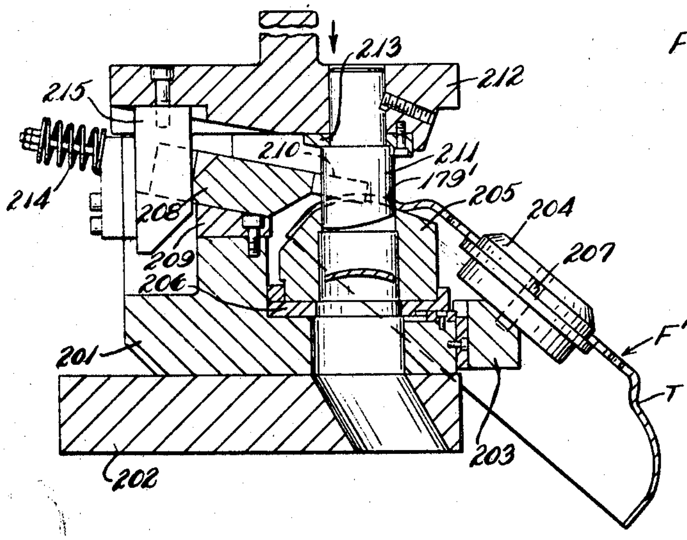

FIG. 20 is a cross sectional view showing the improved hand hole single piercing operation.

FIG. 20*a* is a detached fragmentary sectional view showing the type of hand holes pierced with the apparatus of FIG. 20.

Figures 21, 22, 23:
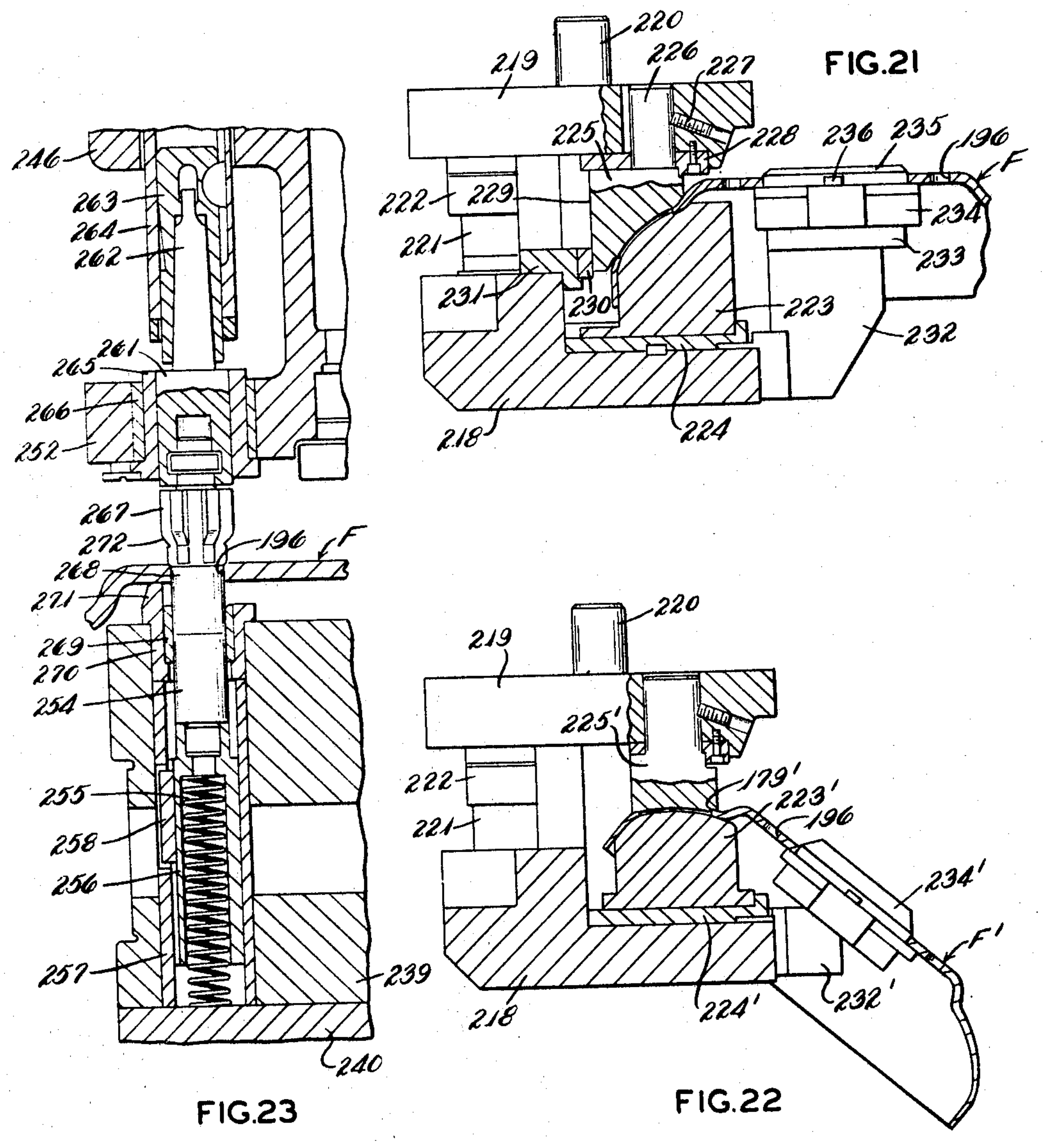

FIG. 21 is a cross sectional view illustrating the coining operation for the hand holes of FIG. 19*a*.

FIG. 22 is a cross sectional view illustrating the coining operation for the hand holes of FIG. 20*a*.

FIG. 23 is a fragmentary cross sectional view showing the operation of drilling and countersinking the bolt holes.

Figure 24:
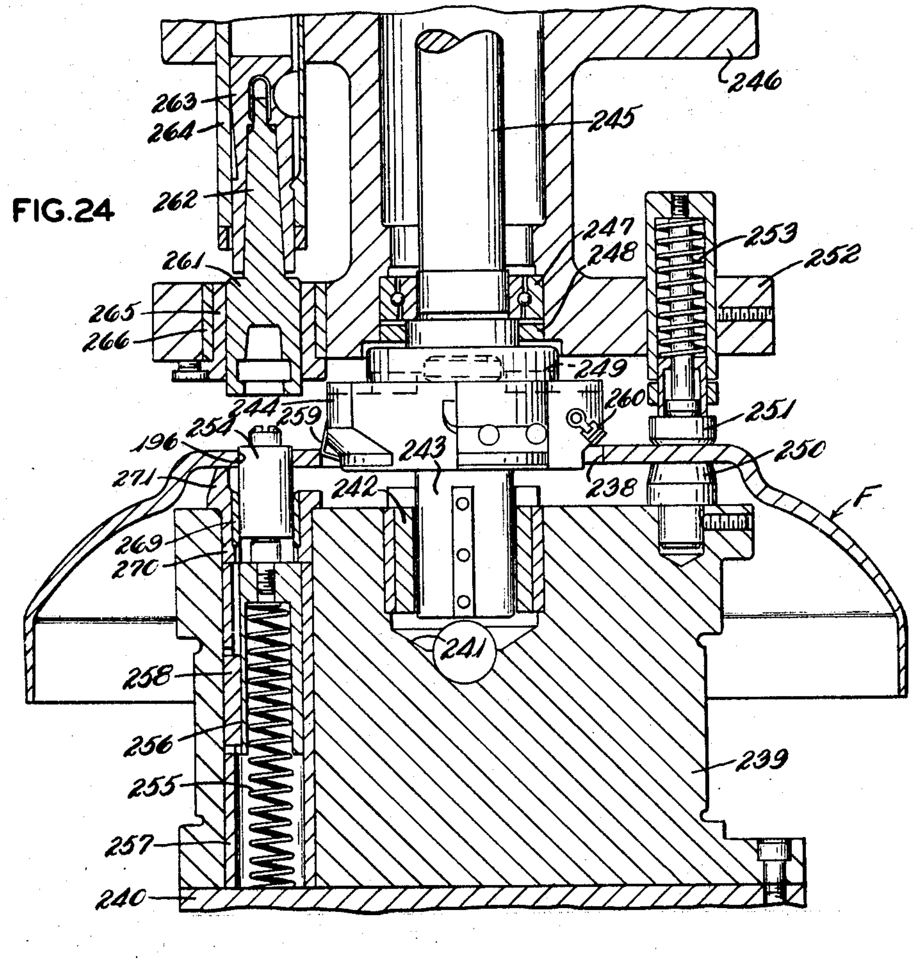

FIG. 24 is a cross sectional view showing the operation of boring and chamfering the hub hole.

Figure 25:
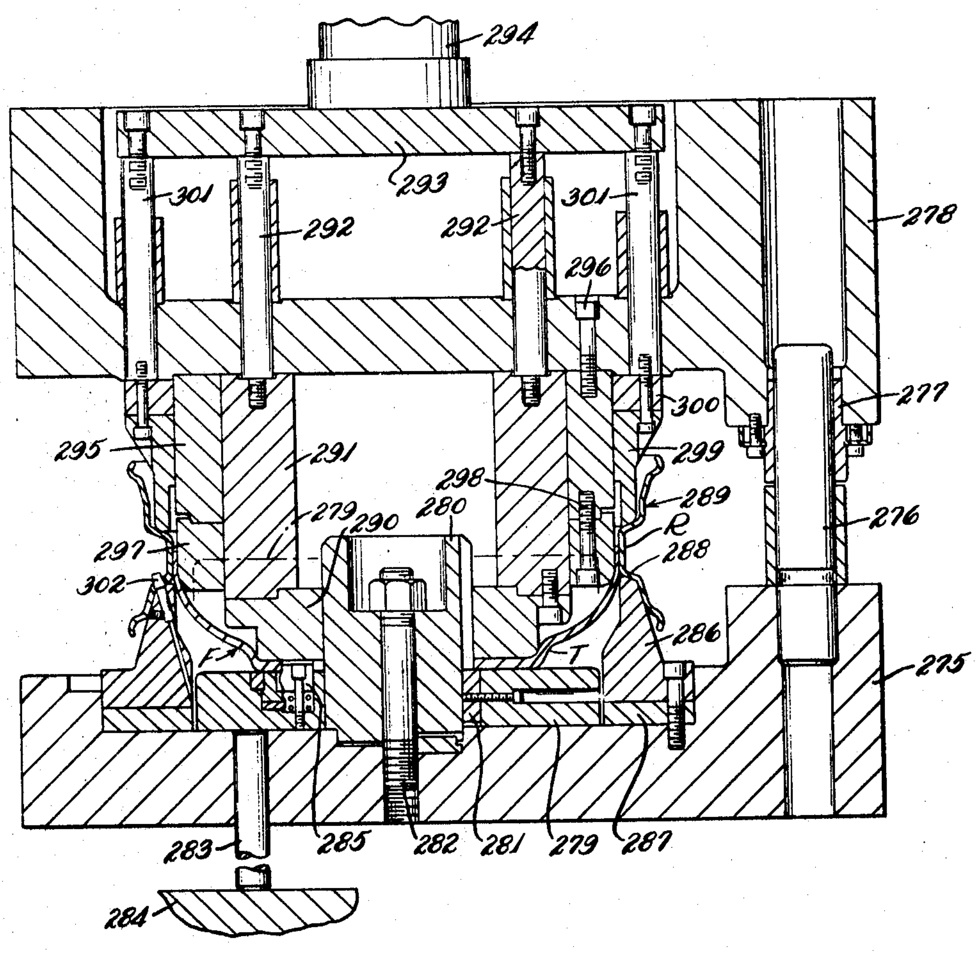

FIG. 25 is a cross sectional view showing the operation of pressing the bowl into one type of rim.

Figure 26:
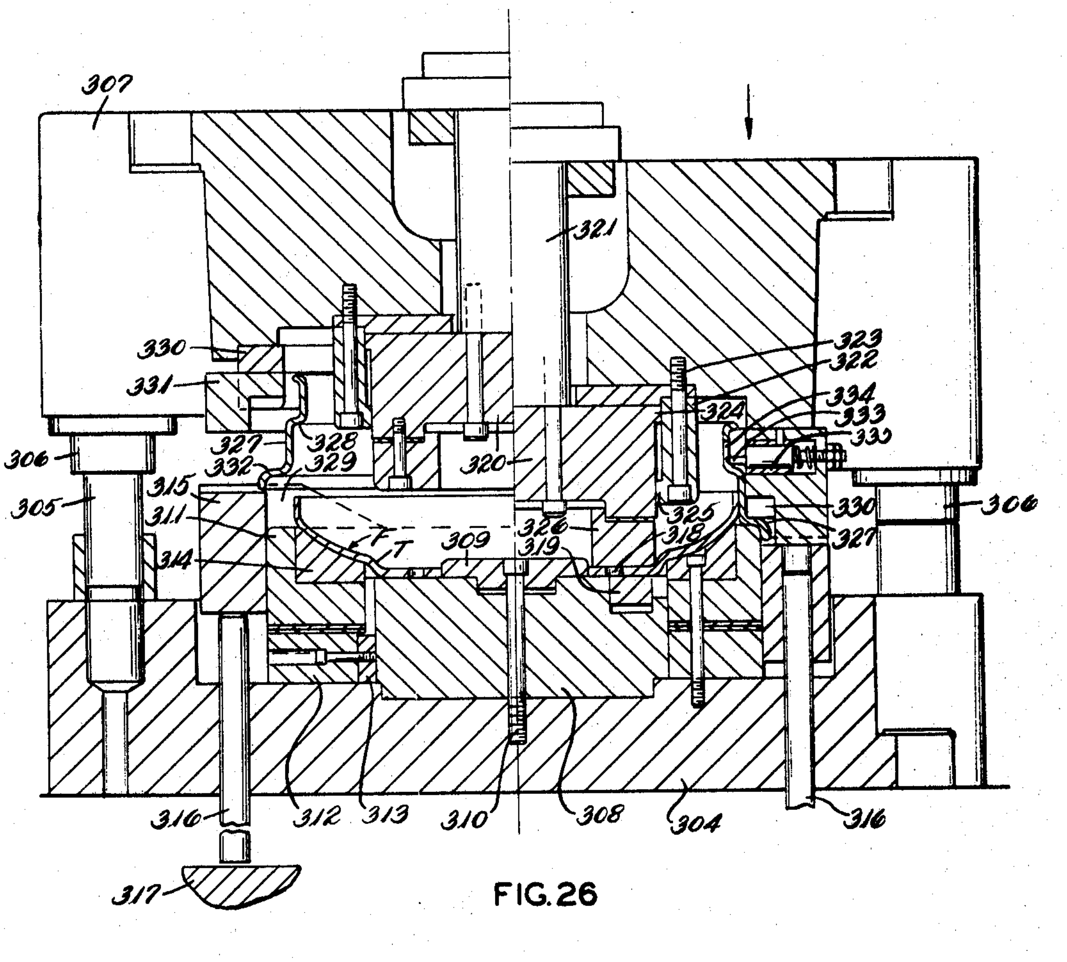

FIG. 26 is a similar view showing the operation of pressing a different type of rim onto the bowl.

Figure 27:
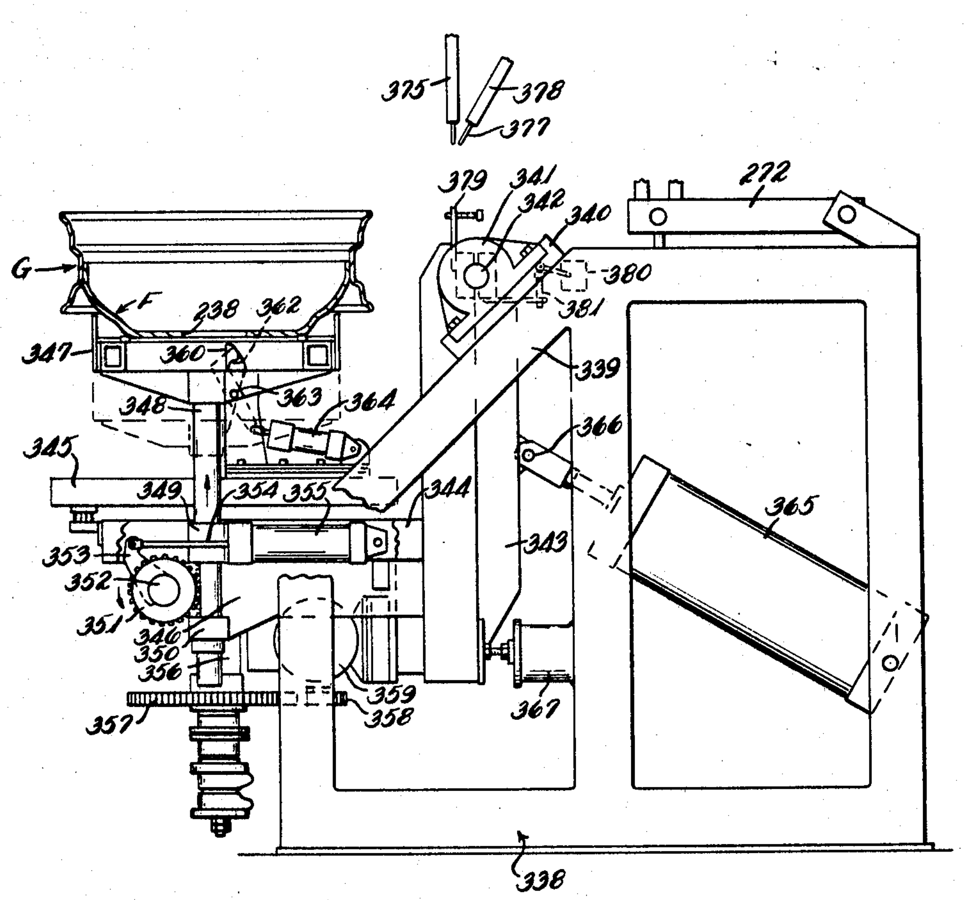

FIG. 27 is an elevational view of the welding apparatus for welding the bowl to the rim, showing the supporting table in position to receive the bowl and rim assembly after the pressing operation of FIG. 25 or FIG. 26.

Figure 28:
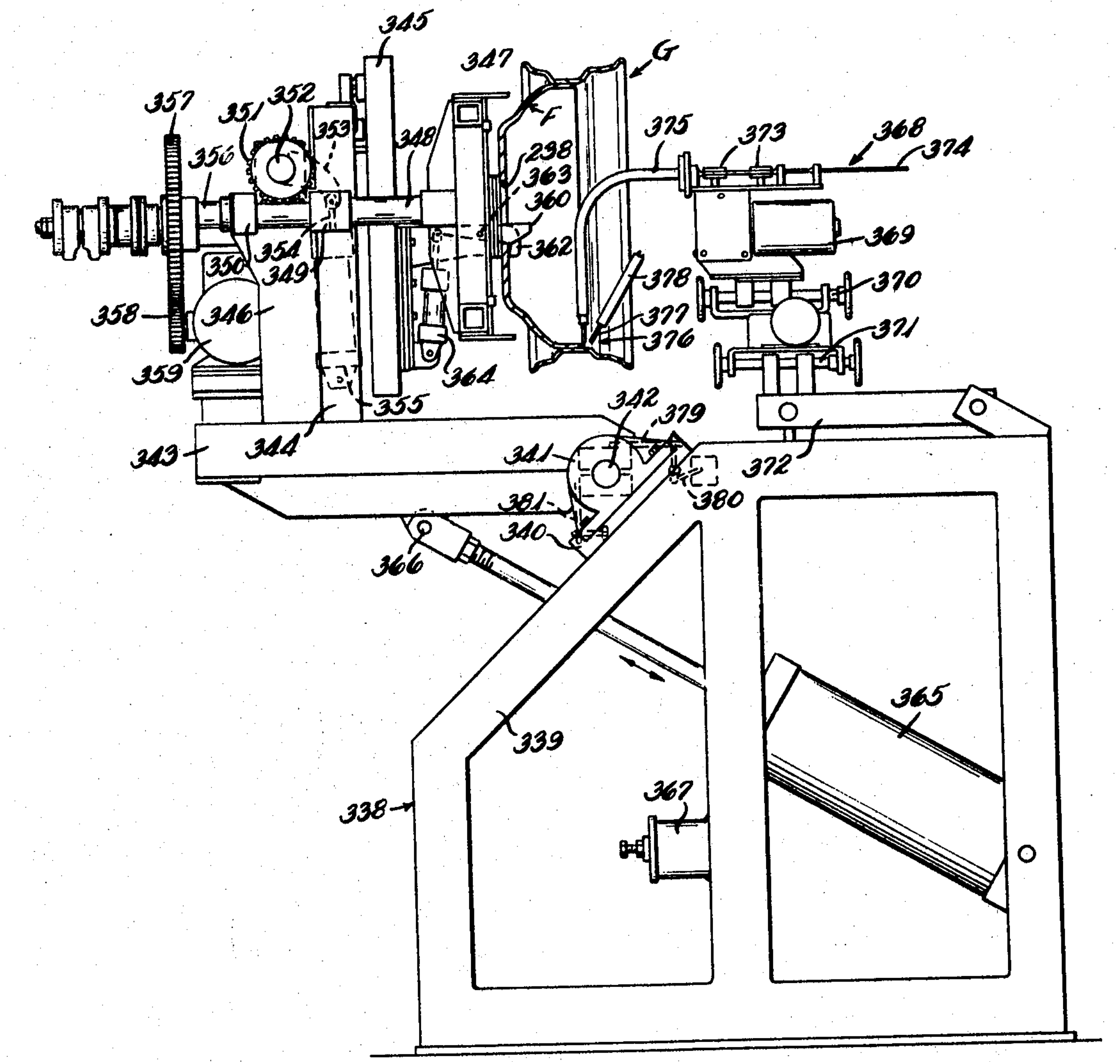

FIG. 28 is a similar view showing the table assembly swung upwardly to bring the assembly into welding position for the welding torch.

Figure 29:
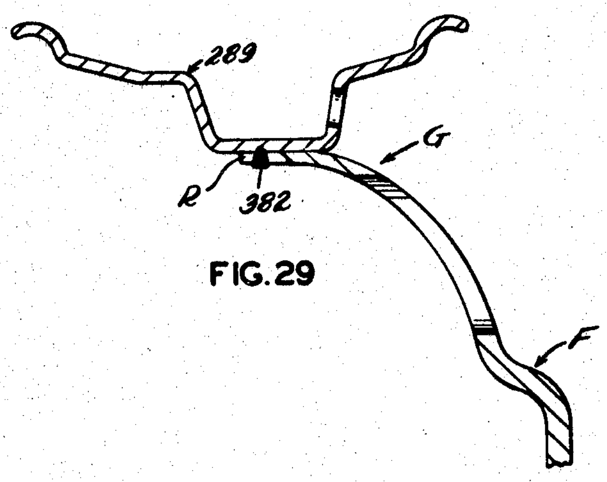
Figure 30:
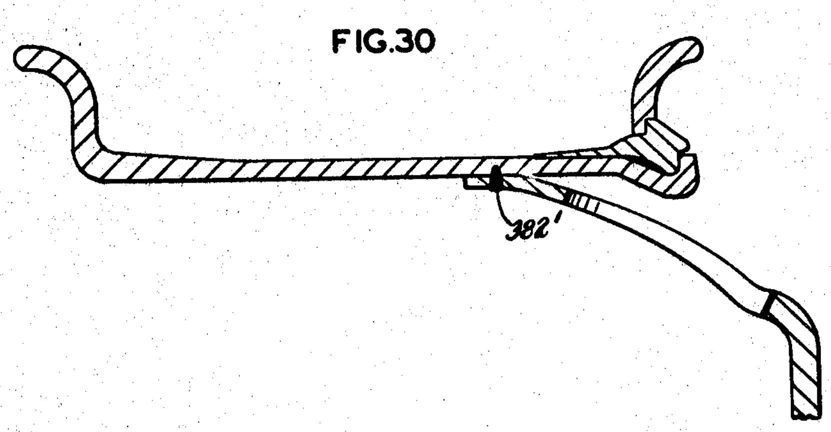

FIGS. 29 and 30 are fragmentary sectional views showing a burn-through type of weld applied to different types of assemblies.

Figures 31, 32:
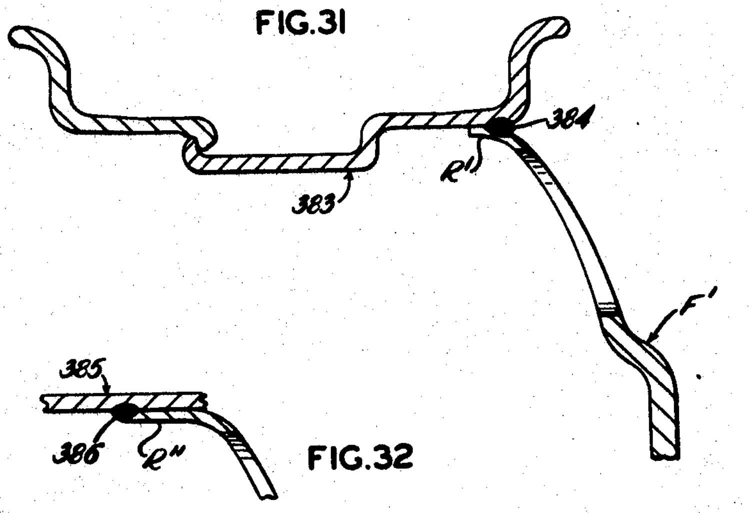

FIGS. 31 and 32 are similar views showing different types of welds applied to other types of assemblies.

Figure 3:
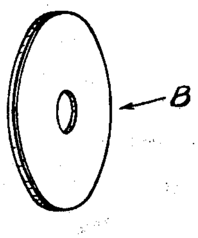
FIG. 3 is a perspective view representing the blank after machining its outer edge.
Figure 4:
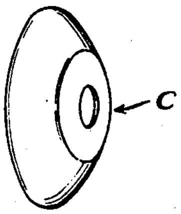
FIG. 4 is a perspective view of the spun bowl.
Figure 5:
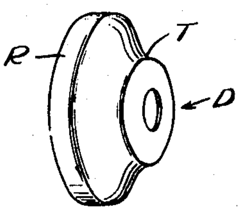
FIG. 5 is a perspective view of the bowl die-formed into finished shape.
Figures 6, 7:
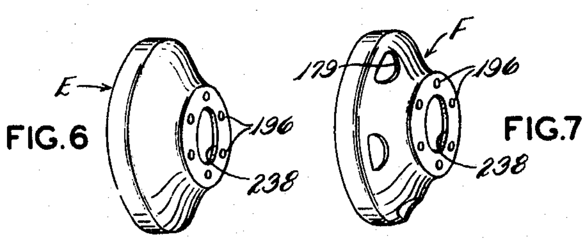
FIG. 6 is a perspective view of the formed bowl after piercing bolt holes in the hub portion.
FIG. 7 is a perspective view of the formed bowl after piercing hand holes in the intermediate portion.

In making a wheel disk having the conventional shape with tapering thickness shown in perspective in FIGS. 5–7 and in cross section in FIGS. 19*a* and 20*a*, the wheels are spun from the flat circular edge-machined disk B shown in FIG. 3 to the intermediate bowl shape C of FIG. 4 (shown in cross section in FIG. 16), and then die-formed to the finished shape D of FIG. 5 (shown in cross section in FIG. 17), followed by hole piercing, coining and machining operations which will be described in detail.

Figure 1:
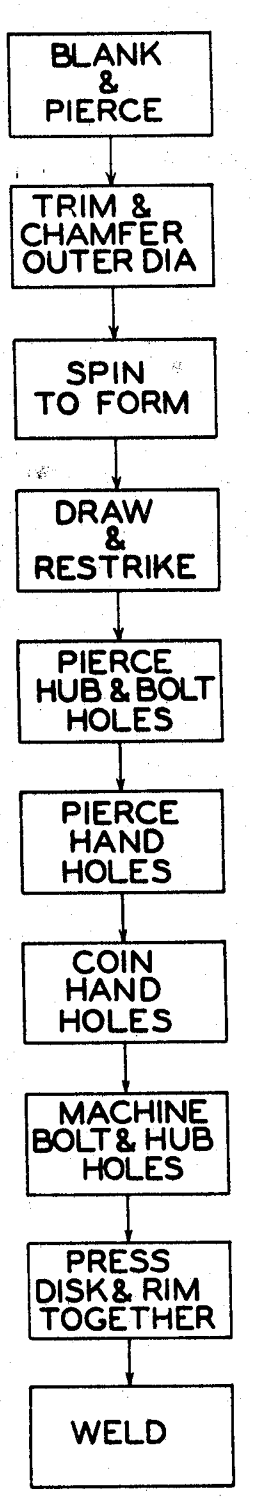
FIG. 1 is a block diagram showing the sequence of the principal operations in making disk wheels according to the present invention.
Figure 2:
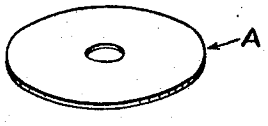
FIG. 2 is a perspective of the flat circular blank from which the bowl portion of the wheel is formed.
Figure 10:
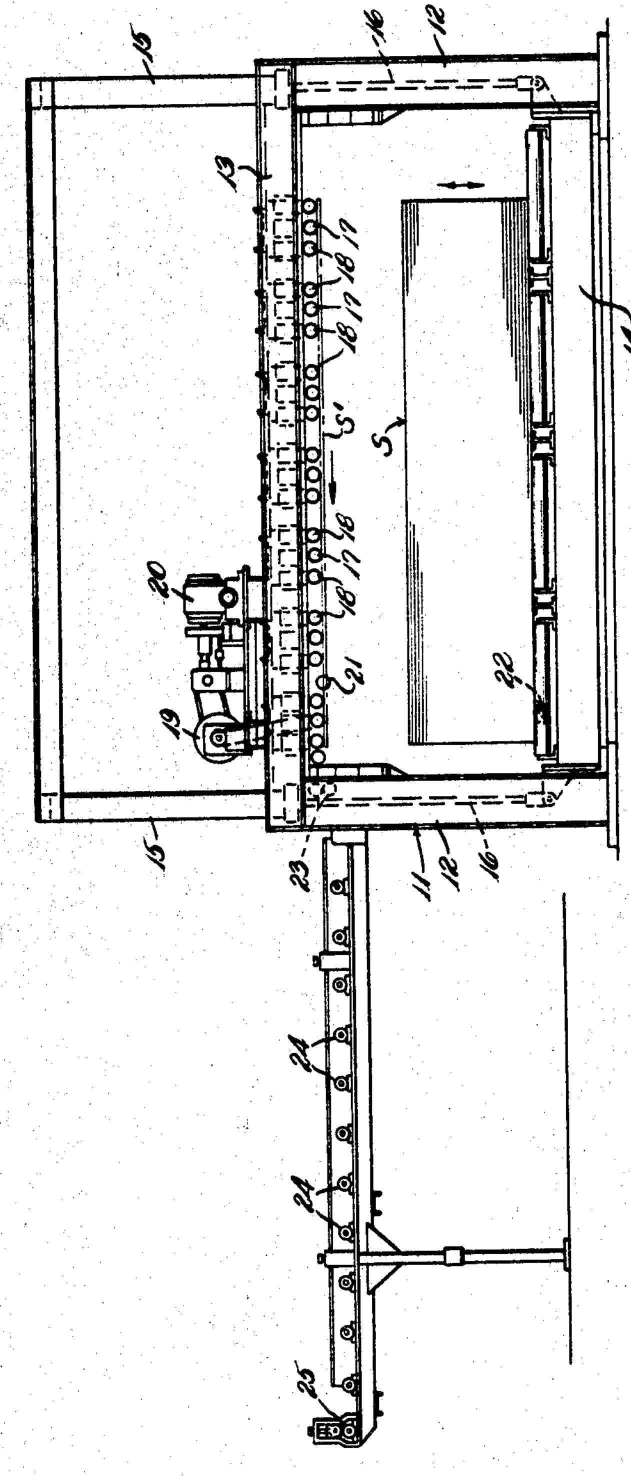
FIG. 10 is a schematic elevational view of the hydraulic stack lifter and roll feeder which automatically feeds plates one at a time to the blanking press.

Before machining, the disks A (FIG. 2) are blanked from flat steel plates or shets which are fed, one at a time, to a blanking press in which are mounted the blanking dies shown in FIGS. 11 and 12. Preferably, a hydraulic stack lifter, magnetic roll sheet gripper and roll feeder, shown in FIG. 10, automatically feed the plates from a stack supported on a hydraulic lift.

Referring to FIG. 10, the plate feeding apparatus comprises a base frame indicated generally at 11 and having upright stanchions 12 and horizontal cross support members 13. A supporting table 14 is vertically slidable between the stanchions 12 and is raised by hydraulic lift cylinders 15 actuating piston rods 16 to raise the table and a stack of plates S supported thereon.

A horizontal series of rolls, preferably in groups of three, is supported in the cross members 13 and arranged to be contacted by the top plate in the stack when the stack is lifted. In each group of three rolls the middle roll 17 is a drive roll and the two end rolls 18 are magnetic rolls. The drive rolls are interconnected by a drive chain which is driven from a pulley 19 driven by a motor 20, and the magnetic rolls 18 are dapted to be energized by electric current in a well-known manner. A pressure switch roll 21, which extends slightly below the level of the rolls 17 and 18 is adapted, when contacted by the top plate in the stack S, to energize the magnetic rolls 18 and start the motor to drive the intermediate rolls 17, at the same time shutting off presure fluid to the cylinders 15 to allow the table 14 to descend. The magnetic force of the rolls 18 is regulated so that only the top sheet S′ will be held by the magnetic rolls as the stack S descends. A limit switch 22 on table 14 is actuated when the bottom plate of the stack is removed, and the switch 22 is in circuit with the control for the hydraulic lifts 15, so that the table can not be raised until a new stack of plates S is loaded thereon.

The drive rolls 17 move the top sheet S′ to the left as viewed in FIG. 10 and it is engaged by the pinch rolls 23 and conveyed onto the conveyor rolls 24 which may also be driven by suitable chain drives from the motor 20. At the outer end of the table is another pair of pinch rolls indicated at 25 which feeds the sheet into the blanking press. This automatic plate feeder may be controlled by the same man who operates the blanking press.

*The blanking operation*

Referring to FIGS. 11 and 11*a*, the blanking dies are mounted in a conventional press and comprise an upper punch holder 26 connected to the press ram 27, and a lower die shoe 28 supported on the bed or table of the press. The die shoe has a central bore 29 through which the central slug punched out of the blank is discharged, and an annular hub hole die 30 and backing plate 31 are supported on top of the die shoe around the central hole 29. An annular male die ring 32 is carried on the upper surface of the die shoe 28 and is adapted to telescope within a female die ring 33 carried on the bottom of the upper die holder 26. Retainer clamp blocks 34 are secured by screws 35 to the die shoe 28 and clamps the male die ring 32 and the hub hole die 30 to the die shoe. The female die ring 33 is similarly clamped to the die holder 26, and preferably a spacer ring 36 is secured to the die holder around the base of the ring 33 to allow for replacing the ring 33 with larger die rings.

The center punch 37 is secured to the die holder 26 by retainer clamp ring 38 and a stripper plate 39 surrounds the center punch 37 within the female die ring 33. The stripper plate is carried by guide rods 40 which are attached at their upper ends to a bridge plate 41 movable in a recess 42 in the die holder and urged upwardly by compression springs 43. A removable knockout bar 44 on the press ram is adapted to engage the bridge plate 41.

In the blanking operation, a plate S′ is fed across the male die ring 32 with the ram in raised position. As the press is operated to lower the ram the male die ring telescopes within the female ring 33 to shear a circular blank and simultaneously punch a circular hub hole at the center of the blank. Referring to FIG. 11*a*, the female die ring 33 has a series of inclined portions 33*a*, 33*b* in its lower edge to provide a shearing action as it telescopes over the male die. Similarly, the bottom portion of the center punch 37 is provided with inclined portions as shown in FIG. 11 to obtain a shearing action as the punch passes through the center of the blank.

As the circular blank A is sheared from the plate S′, the stripper plate 39 retracts to allow the blank A to pass into the female die 33 where it is held by friction as the ram and die holder 26 are raised. The knockout bar 44 is then operated to push the stripper plate 39 down and strip the blank A from the female die. As the blank is sheared, the scrap metal at one side of the male die is held against a pressure block 45 by lifting arms 46 supported on guide rods 47 extending through the die shoe. The scrap metal on the other side of the die ring is deflected away from the die shoe by a recess 48.

Referring to FIGS. 12 and 12*a*, the blanking press is indicated generaly at P, and has the knockout bar 44 extending transversely through the ram 27 for stripping the blank A from the female die as the ram ascends. A sliding carriage 12–1 is mounted on a frame 12–2 on the discharge side of the press for movement to and from the position under the ram shown in full lines.

A fluid cylinder 12–3 is mounted atop the frame 12–2, and has a piston rod 12–4 attached to a flange on the carriage. The inner end of the carriage has inclined portion 12–5 which is adapted to move under the ram and receive the blank therefrom, and a transverse stop bar 12–6 at the base of the inclined portion normally retains the blank thereon. The ends of the stop bar are movable upwardly in slotted brackets 12–7, and are engaged by cam blocks 12–8 on the frame as the carriage moves away from the press, to release the blank and allow it to drop from the inclined portion 12–5 onto a slatted conveyor 12–9 driven by a motor 12–10 on the lower part of frame 12–2.

Assuming the carriage 12–1 is in the full line position of FIGS. 12 and 12*a*, and a plate S' is in the phantom position against a retractible stop 12–11, as the ram 27 descends a micro switch $M_1$ is actuated by a cam on the ram and energizes a solenoid valve (not shown) to operate the piston rod 12–4 and move the carriage to the left out of the way of the ram. On completion of the downstroke the circular blank A is punched out and held in the upper female die as the ram is raised, as previously described.

As the carriage moves to the left the blank A thereon from the previous punching operation is released when the transverse stop bar is raised by contact with the cam blocks 12–8, and drops onto the slatted conveyor 12–9.

As the ram starts to rise it actuates micro switch $M_1$ and energizes a solenoid valve (not shown) to reverse the piston rod 21–4 and return the carriage to its position under the ram. Further rise of the ram causes the knockout bar to drop the blank on the inclined portion 12–5 of the carriage which actuates a micro switch $M_2$ on the carriage in circuit with micro switch $M_1$, causing the carriage to move to the left with the blank thereon. Should there be no blank on the carriage, actuation of micro switch $M_2$ by the descending ram will nevertheless cause the carriage to move to the left out of the way of the press.

A micro switch $M_3$ connected with the press operating circuit is mounted on the frame 12–2, and is adapted to be closed by the carriage when it reaches its extreme left position. Accordingly, the ram cannot be operated to descend unless the carriage is at its extreme left position.

The conveyor 12–9 discharges the blanks successively onto a roller discharge chute 12–12, which in turn guides the blanks onto a table 12–13 where they strike against a vertical stop 12–14 and form a stack of blanks. Side gates 12–15 form guide walls on opposite sides of the stack, and the gates are vertically slidable in vertical guide bars 12–16. Fluid motors 12–17 are adapted to operate lift chains 12–18 attached to said gates 12–15 and allow a stack of blanks to be conveyed laterally in either direction by a drag chain 12–19 on conveyor rollers which deliver the stack to the spinning operation.

The fluid motors 12–17 may be operated to raise the gates 12–15 by a micro switch $M_4$ which is actuated by the stack of blanks when it reaches a predetermined height. The gates 12–15 are preferably adjustable relative to each other for various sizes of blanks by means of adjusting screws 12–20 on the frame 12–21.

*The spinning operation*

Referring to FIGS. 13 and 14, stacks of the blanks A are conveyed or taken to a feeder conveyor 50 which feeds the stacks successively onto the table 51 of a stack lifter 52. The table 51 is raised and lowered by a vertical screw 53 which is driven by a motor 54 through a gear box 55.

The height to which the stack is raised is determined by a limit switch (not shown) which contacts the top blank A on the stack, and a transfer arm 56 has a finger at its outer end which engages in the hub hole of the top blank only. A hydraulic cylinder 57 actuates the transfer arm 56 to slide a top blank A from the stack onto a swinging lift rack 58 when the rack is in the horizontal position shown in FIG. 13.

The transfer arm 56 is connected by a floating pivot 59 to one end of an arm 60, the other end of which is pivoted at 61 on the base of the machine. The outer end of transfer arm 56 has a slot 62 engaging a stationary pin 63 on the machine. This arrangement provides for transferring the top blank A from the stack in a straight line longitudinally of the machine onto the rack 58.

The rack 58 is pivoted at its inner end on a base 64 for swinging from a horizontal to a vertical position and may be actuated by any suitable means (not shown). The swinging movement of the rack 58 is suitably coordinated with that of the transfer arm 56 so that when a blank is placed on the rack the arm returns to pick up another blank from the stack, and the rack swings to the vertical position of FIG. 14.

When the rack 58 is in vertical position, the blank A thereon is aligned with a longitudinal track 65 adapted to guide a series of blanks longitudinally of the machine. A traveling arm 66 extends alongside of the track and has a plurality of depending arms 67 having fingers at their lower ends adapted to engage the hub holes of blanks on the track 65. The finger on the rearmost arm 67 is adapted to engage in the blank A supported on the rack 58 in vertical position.

The traveling arm 66 is reciprocated by a hydraulic cylinder 68 controlled by suitable controls such as limit switches, not shown. As the arm 66 is reciprocated, the blanks A are advanced longitudinally along the track 65 step-by-step to the various stations or positions $A_1$–$A_6$ shown in FIG. 14, and when a blank A is advanced from the rack 58 onto the track 65, the rack swings back to horizontal position to receive the next successive blank from the transfer arm 56.

When a blank reaches the station $A_3$, the outer edge surface thereof is machined and one corner is chamfered. At this station is a tailstock 69 movable on a transverse slide 70 and having a nose which is inserted through the hub hole of the blank, and displacing the blank so that the nose fits in the spring-loaded spindle 71 of the headstock 72. With the blank in this position, the spindle is then rotated by a drive belt indicated at 73, and the blank is engaged by a turning tool 74 on one side and by a diametrically opposite chamfering tool 75 (see FIG. 15). The turned and chamfered disk is designated B in FIGS. 3 and 15.

The disk B is then advanced along the track 65 to the positions $A_4$ and $A_5$ successively. At the position $A_5$ a suitable lubricant is applied to one surface of the disk to prepare it for the spinning operation. This lubricant may be applied by a device indicated generaly at 76 which has a spindle 77 for rotating the disk while pressing a bar of tallow or the like against the surface of the disk.

When each disk B reaches station $A_6$ it enters a rack 78 supported on a turntable 79, the aligned position of the rack being indicated in phantom in FIG. 14. The turntable is then rotated 90° to the full line position shown in FIGS. 13 and 14 so that the disk B is positioned transversely of the machine. in this position, the disk B is adapted to be picked up by an overhead traveling arm indicated at 80 in FIG. 14 and carried forward to the spinning mandrel 81.

The lifting arm 80 is mounted on a carriage 82 and is raised or lowered by a hydraulic cylinder 83 on said carriage. A second lifting arm 84 is similarly mounted on said carriage to the rear of arm 80 and is adapted to be raised and lowered by hydraulic cylinder 85 on said carriage. The carriage 82 is movable along a longitudinal beam 86 by means of rollers 87 rolling on the top and bottom of the beam. The carriage is attached to a drive chain 88 which is driven by a motor 89 and chain 90 for reciprocating the carriage back and forth on the beam 86.

Each of the arms 80 and 84 have at their lower ends toggle clamps indicated generally at 91 and 92, respectively, having clamping jaws which preferably are operated by compressed air cylinders. The front clamp 91 is adapted to pick up and advance the disks B while the rear clamp 92 is adapted to pick up and return the spun bowls C from the spinning operation. When the front arm 80 has positioned a disk B facing the mandrel 81, the tailstock 93 is slid forwardly on the base 94 to engage the nose 95 of the floating spindle 96 of the tailstock in the hub hole of the disk, and as the nose enters the mandrel (FIG. 16) the clamp 91 releases the disk and arm 80 is raised. The spindle 96 has a magnetic stop plate 97 at the base of the nose 95 so that when the tailstock is retracted at the end of the spinning operation, the spun bowl C will be stripped from the mandrel 81. When the tailstock 93 is retracted to the position of FIGS. 13 and 14, the bowl C is stripped from the nose 95 by diametrically opposite stripper pins 98 mounted in a frame 99 on the tailstock base 94.

Just before the bowl is stripped from the nose 95, the rear lifting arm 84 is lowered and the clamp 92 clamps the bowl, and then when the bowl has been stripped from the nose the arm raises the bowl to the upper position indicated in FIG. 14 and the carriage is retracted to position the bowl over an inclined discharge chute 100, as indicated in full lines in FIGS. 13 and 14. The clamp 92 then releases the bowl C into the chute and the front arm 80 descends with its clamping jaws open to pick up the next disk B, whereupon the carriage again moves forward and the operation is repeated.

The spinning mandrel 81 is rotatably mounted on a headstock 101 and is driven by a motor 102 through a belt drive 103. The spinning tool or tool ring 104 is journaled in a bearing housing 105 (FIG. 16) in a yoke 106, and the yoke is carried on a cross slide 107 (FIG. 13) movable at right angles to the main slide 108 which is angularly movable on the base 94 at an angle to the axis of the headstock 101. Thus the tool ring 104 can be moved in two directions to follow the contour of the spinning mandrel 81, and the movement of the tool ring is controlled by a template 109 of proper contour, supported on the main slide and engaged by a tracer finger 110 on the cross slide. The main slide may be operated by a suitable hydraulic ram 111, and the cross slide may be operated by a suitable hydraulic ram 112.

By using suitable and well-known controls such as limit switches actuating solenoid valves controlling the operation of fluid cylinder means for the various mechanisms, the entire operation from the stack lifter for the blanks A to dropping the spun bowls C into the discharge chute 100 is carried out automatically.

During the spinning operation, as the tool ring 104 is moved to follow the contour of the spinning mandrel 81, each circumferential element of the disk is displaced axially, but not radially, of the mandrel as the tool moves along the mandrel so that the outer diameter of the disk is maintained constant at all times and the outer diameter of the finished bowl is accordingly the same as that of the original disk. The contour of the spinning mandrel is such that as the circumferential elements of the disk are successively displaced axially the thickness of the disk is gradually tapered to compensate for the axial displacement and maintain the constant outer diameter. The intermediate portion of the disk may be arcuate or a parabolic curve, and the thickness tapers in proportion to the sine of the angle formed by the tangent at any point on said curve with respect to the axis of the finished bowl; or, stated another way, the thickness tapers in accordance with the progressive change in the sine of the angle formed betwen the tangent to said curved portion and its axis. For example, the thickness at the hub portion may be approximately 2.5 times that of the thickness at the outer edge. Thus, the hub portion may be 0.375" thick, and the outer edge 0.156" thick.

Accordingly, the spinning operation performs a cold working of the metal without improperly stressing it, so that optimum physical characteristics are obtained resulting in maximum strength and resiliency in the finished product. Because of the optimum physical characteristics produced by the improved spinning operation, it is not necessary to hot or cold work the disk prior to the spinning operation; nor is it necessary to subsequently treat the metal to relieve stresses therein.

Moreover, due to the curved path followed by the tool ring, the wear on the spinning nose is distributed over its curved surface. Obviously, by providing a symmetrical nose medially of the tool ring, additional tool life can be obtained by reversing the ring.

*The die-forming operation*

The spun bowls C are taken from the discharge chute 100 to a press of conventional construction in which are mounted the forming dies shown in FIG. 17. Attached to the ram of the press in the usual manner is the punch holder 114, and the die shoe 115 is supported on the bed or table of the press. Guide pins 116 are press-fitted into bores 117 in the die shoe, and are slidably received in bushings 118 secured in bores 119 in the punch holder by retainer rings 120.

A punch backing plate 121 is secured to the under surface of the punch holder by screws 122, and is provided with a centering boss 123 received in a bore 124 in the punch holder. A forming punch ring 125 is held against the backing plate 121 by screws 126 and a hub face restrike punch 127 is slidably mounted in the punch ring 125. Annular shoulders 128 and 129 on the punch ring and hub face restrike punch, respectively, limit the relative motion therebetween. Springs 130 located in the punch holder 114 and extending through the backing plate 121 yieldingly urge the hub face restrike punch 127 downwardly.

The hub face restrike punch has an axial bore 131 which slides over an axial centering plug 132 adapted to fit the hub holes in the bowls C and secured in the die shoe 115 by a screw stud 133. Surrounding the punch ring 125 is an annular flange stock guide 134 supported on the die shoe by brackets 135 and having circumferentially arranged spring centering pins 136 to center a spun bowl C when it is placed in the guide 134 before the ram and punch holder descend.

The female forming die is supported on a backing plate 137 seated in the die shoe, and comprises a hardened central die pad 138 through which the centering plug 132 extends. Surrounding the die pad is a cup-shaped die retaining ring 139 which encloses and supports a contour die ring 140 and a die ring 141 for forming the rim flange on the bowl. The outer annular surface of the retaining ring 139 is slightly tapered and is wedgeably held in position by a wedge ring 142 secured to the die shoe by screws 143. A clamping ring 144 holds the die ring 141 in place against the upper surface of the contour ring 140.

In the operation of the forming dies, as the punch descends and enters the bowl C positioned within the guide ring 134, the springs 130 cause the hub face restrike punch 127 to yieldingly engage the hub portion of the bowl before the punch ring 125 engages the curved rim of the bowl. When the hub portion bottoms, the punch ring 125 then draws the curved portion of the bowl against the contour die 140, and in order to prevent wrinkling or buckling of the rim portion of the bowl during this operation an annular beveled surface 145 is provided to substantially conform to the angle of the outer rim of the bowl C and allow the metal to be drawn gradually and smoothly into the flange rim R of the formed bowl D (FIG. 5).

As seen in FIG. 17, the contour ring 140 cooperates with the punch ring 125 to form the annular shoulder T in the formed bowl betmeen the flat hub portion and the intermediate curved portion. The gradually tapering thickness from the hub portion to the outer rim of the bowl is substantially maintained in the forming dies, although a slight thinning of the rim flange R may be accomplished.

The shock of the hub face restrike punch bottoming on the hub portion of the bowl is preferably cushioned by means of pins 146 supporting the die pad 138 and extending through the die shoe to contact a cushion plate 147 cushioned by compressed air in the base of the press.

As the punch holder 114 is raised after the forming operation, the interengaging flanges 128 and 129 of the restrike punch and contour die ring cause the restrike punch to strip the rim flange R of the bowl from the outer punch ring 125. As the punch holder continues to rise, the air cushion pins 146 will raise the formed bowl out of the forming dies 140 and 141. A tie strap 148 may be provided to fasten the dies together when stored.

*The bolt and hub hole piercing operation*

The formed bowls D are taken from the die forming press and successively placed in a press of conventional construction having piercing dies shown in FIG. 18 for multiple piercing a circular series of bolt holes in the flat hub portion of the bowl, and simultaneously repiercing the axial hub hole to a larger diameter. A punch holder 150, with its spring retainer plate 151, is attached in a usual manner to the ram of the press, and the die shoe 152 is supported on a filler plate 153 on the press table.

Guide pins 154 in the die shoe extend slidably through a bushing 155 held in the punch holder 150. A center punch 156 has a center pilot 157 mounted therein by a jack screw 158 which is threaded into the die holder 150, and the diameter of the pilot 157 is such as to pass through the hub hole of a bowl D and center the bowl with respect to the punch. The center punch 156 has an upper boss which fits into a punch retainer ring 159 abutting a backing plate 160. Surrounding the punch 156 and normally abutting the retainer ring 159 is a stripper plate 161 having a nose 162 for seating within the shoulder T of the bowl, formed during the previous operation, and maintaining the bowl accurately concentric to the hub hole during the piercing operation.

The stripper plate 161 is yieldingly urged downwardly by spring-loaded press 163, and in place of at least one of the pressure pins is a locating pin 164 adapted to engage in a recess in the stripper plate to prevent rotary movement of the stripper plate. A guide flange 165 partly surrounds the stripper plate 161 on each side and has spring-loaded centering buttons 167 in its upper edge portion to engage the rim flange R of the bowl and center it as the pilot 157 descends. Guides 166 diametrically opposite to the flange guide 165 serve to support the bowl as it is slid into and out of position.

The bottom of the center punch 156 has inclined portions to provide a shearing action as the center slug 168 is punched out of the hub portion of the bowl, and the die shoe 152 has a bore 152' through which the slug 168 is discharged. A die pad 169 is mounted in the die shoe 152 on a backing plate 170, and the pad 169 is held in place by a retainer ring 171. A series of bolt hole punches 172 extend through the stripper 161 and are secured in the punch retainer ring 159 against the backing plate 160. The punches 172 have reduced end portions 173 for entering bores 174 in the pad 169 when the hub portion of the bowl is pierced. The shoulder 175 at the top of the reduced portion 173 of each punch is beveled to cause a coining action around the inside edge of the pierced bolt hole.

Between two adjacent punches 172 a name stamp 176 may be provided for stamping a designation in the inner surface of the hub portion against an anvil 177 seated in the die pad 169 in line with the stamp 176. A filler block 178 may be provided between the anvil 177 and the backing plate 170.

In the operation of the multiple piercing dies, assuming that a bowl D is located within the guide flange 165, as the ram of the press descends the pilot 157 enters the hub hole, and the pressure pins 163 and 164 yieldingly press the stripper plate 161 as its nose 162 seats within the nose T of the bowl to accurately align the bowl with the axis of the punch. The ram then continues downward to pierce the hub slug 168 and the circular series of bolt holes 178 in the flat hub portion, the inner edges of the holes being coined at the finish of the piercing operation. After the ram is raised, spring-loaded pressure pins yieldingly hold the stripper plate 161 as the punches 172 and the center punch 156 are stripped therefrom. The pierced plate is designated E in FIGS. 6 and 18.

*The hand hole piercing operation*

The bowls E are successively placed in a conventional press having hand hole punching dies such as shown in FIG. 19 or FIG. 20. In disk wheels of the type shown at F in FIG. 19*a*, in which the hand holes 179 are pierced axially of the bowl, the holes may be multiple-pierced by the die shown in FIG. 19. In other types of wheels F', having a somewhat different contour, the hand holes 179' are pierced at an angle to the axis of the bowl as shown in FIG. 20*a* by dies such as shown in FIG. 20.

Referring to FIG. 19, the punch holder 180 and its spring retainer plate 181 are secured to the ram in a usual manner and the spring retainer plate 181 backs up springs (not shown) which bear upon a stripper ring 182 within a stock guide ring 183 carried on the die pad 184 and on the retainer ring 185 surrounding the upper portion of the die pad. The circularly arranged hand hole punches 186 are secured at their upper ends in the punch holder 180 and extend through a spacer plate 187 abutting the die holder. The spacer plate 187 abuts shoulders formed on the punches 186, and the enlarged portions of the punches below the shoulders are mounted within a punch retainer ring 188.

The punches 186 surround a central retainer plate 189 secured to the punch holder by bolts 190, and a coining plate 191 is secured to the retainer plate 189 by a jack screw 192 and locator pad 193. A series of coining buttons 194 is mounted on a pad backing ring 195 and adapted to register with the bolt holes 196 pierced in the previous operation. A back-up right 197 is mounted in the coining plate 191 above the bolt holdes and has openings registering with said bolt holes. The coining buttons 194 have rounded upper ends to coin the edges of the bolt holes 196 on the lower or outer surface of the hub portion.

The locator pad 193 has a spring-loaded pilot shaft 198 depending therefrom and the pilot shaft is slideable in a sleeve 199 for locating the bolt holes 196 in registry with the coining buttons 194 as the punch holder descends and before it bottoms. The plate 191 holds the hub portion of the bowl in flat condition during the piercing and coining operations.

As the ram of the press is raised following the coining operation, the spring-loaded stripper plate yieldingly presses downwardly on the bowl to strip the punches 186 therefrom. The stripper plate has circumferentially spaced depending portions 200 for engaging the curved portion of the bowl between the punches 186, as indicated in dotted lines in FIG. 19. After the punches 186 have been stripped from the bowl, the springs **198*a* raise the pilot shaft and strip the bowl from the die pad 184**.

The angularly directed hand holes 179' in the type of wheel F' shown in FIG. **20*a* are punched singly in the manner shown in FIG. 20. Preferably, the bowl E is inverted and held in an inclined position on the die shoe 201 of a relatively small press having a riser plate 202 supporting the die shoe. A support bar 203 is secured to the front face of the die shoe and a flanged circular locating pad 204 is mounted in an inclined position for holding the inverted inclined bowl with the upper part of its curved portion over a female die block 205 supported on a backing plate 206 on the die shoe 201. A spring-loaded indexing pin 207 is mounted in the edge of the locating pad 204** and is adapted to enter a bolt hole in the bowl for successively locating the hand holes as the bowl is rotated after each single piercing operation.

A stripper plate 208 is slidable on a guide plate 209 secured to die shoe 201, and has an outer yoke portion 210 for engaging the bowl laterally of a piercing punch 211 carried in the punch holder 212 which is secured to the ram of the press. A retainer guide ring 213 fits between the punch holder 212 and a shoulder formed on the punch 211. The intermediate curved portion of the bowl F' is positioned over the die block 205 so that the punch 211 is substantially tangent to said curved portion. The stripper plate has a return spring 214 connected thereto for urging the plate 208 away from the die block 205. When the punch holder descends, a cam bar 215 depending therefrom moves the stripper plate inwardly to the position shown in FIG. 20, and when the punch holder is raised to clear the cam bar 215 above the stripper plate 208, the spring pulls the plate out of the way to allow indexing of the bowl to its next position. During the initial upward movement of the punch holder, the stripper plate 208 holds the bowl against the die block 205 to strip the punch 211 from the bowl.

*The coining operation*

The hand holes 179 and 179' in the two types of wheels F and F' shown in FIGS. 19*a* and 20*a* preferably have their edges coined on both sides in the coining dies shown in FIGS. 21 and 22, respectively. This coining operation not only removes sharp edges for handling purposes, but smooths out any small cracks or fractures caused by piercing, which cracks might otherwise develop into wheel failures. In each case a lower die shoe 218 is supported in a suitable press and the punch holder 219 is attached to the ram of the press by means of a shank 220. Guide pins 221 in the die shoe slidably engage bushings 222 mounted in the punch holder for maintaining the upper and lower dies in alignment.

Referring to FIG. 21, the lower coining die 223 for coining the hand holes 179 is supported on a backing plate 224 on the die shoe, and has an upper contour conforming to the curved intermediate portion and rim flange of a wheel F, and adapted for coining the inner edge of a hand hole 179 when pressure is applied to the outer edge by a coining punch 225. The coining punch 225 has a shank 226 secured in the punch holder by set screw 227 and retaining ring 228. The radially outer face 229 of the coining punch is adapted to slidably engage a wear plate 230 backed up by a heel block 231 supported on a ledge of the die shoe, to exert radially inward pressure on the punch as it contacts the intermediate curved portion of the wheel F. The lower surface of the coining punch is contoured to conform to and coin the outer edge of the hand hole 179.

Extend laterally from the front of the die shoe are spaced-apart bracket plates 232 carrying a support plate 233 extending across their top edges, and a hub centering pad 234 rests on the support plate 233 and has a circular top centering boss 235 for fitting in the hub hole of a wheel F to position the hand holes 179 thereof successively over the coining die 223. An indexing pin 236 may be provided on one side of the centering pad 234 for entering successive bolt holes 178 in the flat hub portion of the wheels as the hand holes are positioned over the coining die 223.

Referring to FIG. 22, the coining die 223' is supported on a backing plate 224' on the die shoe 218 and has an upper contoured surface for conforming to the curved portion of a wheel F' and coining the inner edge of a hand hole 179' therein when the wheel is positioned in an inverted inclined position by the centering pad 234' mounted on a support block 232' extending laterally from the die shoe. The coining punch 225' is mounted in the punch holder 219 substantially perpendicular to the tangent of the intermediate curved portion of the bowl, and has a lower contour for cooperating with the coining die to coin the outer edges of the hand holes.

In both types of wheels the holes 179 and 179' are successively coined simultaneously on both inner and outer edges, providing a minimum number of operations and eliminating the need for expensive machining or chamfering operations.

*Machining hub holes and bolt holes*

Referring to FIGS. 23 and 24, the parts of a drill press for machining (when required) the hub holes 238 of wheels F are shown in FIG. 24 and fragmentarily in FIG. 23. In each case a die shoe 239 supported on the table 240 of the press has a recess 241 (FIG. 24) in which is mounted a pilot bushing 242 adapted to receive the pilot 243 depending below the boring and chamfering tool 244. The tool is carried on the drive spindle 245 mounted in the tool holder housing or nesting plate 246 of the press. The spindle 245 is journaled in an anti-friction bearing 247 in the housing ad enclosed by a dust cap 248. The tool 244 is suitable keyed to the spindle by keys 249.

The wheel F is supported on a series of anvil pins 250 arranged circularly of the pilot bushing 242 between the bolt holes 178, and adjustable pressure pins 251 are mountel in the lower flange 252 of the tool holder housing in positions opposing said anvils 250. The pressure pins are yieldingly urged downwardly by springs 253 and cooperate with the anvils 250 to hold the hub portion of the wheel in horizontal position.

Locating pins 254 are provided in the die shoe 239 for entering the bolt holes 196 of the wheel F to hold the wheel F against rotation when the hub hole 238 thereof is being machined, as indicated in FIG. 24. Each locating pin 254 is biased upwardly by a spring 255 mounted in a retainer sleeve 256 which is keyed in an outer sleeve 257 by key 258. The boring and chamfering tool has a plurality of cutting inserts 259 for boring the hub hole 238 and a plurality of chamfering inserts 260 for chamfering the outer edge of the hole. A plurality of tool holders 261 for bolt reaming tools is mounted in the tool holder housing 246 in alignment with the locating pins 254. Each tool holder 261 has a tapered shank 262 held in an adaptor 263 in a drive quill 264. The socket portion of the tool holder 261 is journaled in a bushing 265 mounted in a liner 266 in the lower flange 252 of the housing.

Referring to FIG. 23, for the bolt reaming operation reaming tools 267 are mounted in the socks 261 of the tool holders. Each reaming tool is preferably fluted and has a depending pilot 268 which is the same diameter as the locating pin 254. Thus, as the pilot 268 enters the bolt hole 178, it moves the locator pin 254 downwardly and enters the pilot bushing 269 which is slidably engaged by the locator pin 254. The pilot bushing 269 is mounted in a bushing retainer 270 which is provided with an upper extension 271 for supporting the hub portion of the wheel adjacent the hub hole. Preferably, the reaming tool 267 has a beveled portion 272 at the bottom of its flutes which countersinks the bolt hole at the end of the reaming operation. As the reamers 267 are moved upwardly out of the reamed holes, the locator pin is moved upwardly by its spring 255.

Accordingly, in the bolt hole boring operation, the wheel F is aligned accurately by the locator pins 254 and then held positively to maintain alignment during the boring operation by the pilot extensions 268 which enter the pilot bushings and push the locator pins downwardly therein.

*Assembling the disk and rim*

After the hand holes have been pierced and coined, and after such machining of the bolt and hub holes as may be required, the bowls F are pressed into metal rims of conventional construction in preparation for being welded together. The dies for pressing the wheel into a conventional drop center rim used for a tubeless tire are shown in FIG. 25. A similar operation is carried out for assembling the wheels in flat base rims. Certain types of rims having an annular offset portion require dies such as shown in FIG. 26 for pressing the rim onto the disk rather than pressing the disk into the rim as in FIG. 25.

Referring to FIG. 25, the lower die shoe 275 is supported on the bed of the press and has guide pins 276 therein which are slidable in a usual manner in bushings 277 in the punch holder 278. A die pad 279 is supported on the die shoe and a pilot shaft 280 is non-rotatably secured in the pad 270 by a key 281 and held on the die shoe 275 by a bolt 282. Pin 283 extend through the die shoe 275 and are supported by a fluid cushion member 284 in the lower part of the press, and these pins act to raise the pad 279 to a loading position, indicated in phantom, when the press ram is raised.

A locator finger 285 is mounted in the pad 270 for centering one of the bolt holes in the bowl F to hold the bowl against rotation. Surrounding the pad 279 is a die ring 286 mounted on a backing plate 287, and the upper rim of the die ring is adapted to engage and support the shoulder 288 on one side of the drop center portion of the rim 289.

The pressure plate 290 of the punch is provided with a rounded nose for centering within the shoulder portion T of the wheel to positively hold the wheel in alignment as the pressure plate bottoms on the hub portion of the bowl. The pressure plate 290 is secured to a filler or adaptor ring 291 which abuts the lower surface of the punch holder 278 and is supported by stripper pins 292 connected at their upper ends to a stripper plate 293 attached to an air cushioned ram 294 within the press ram.

Surrounding the filler ring 291 is a pressure ring adaptor 295 secured to the punch holder by screws 296, and a rim flange pressure ring 297 is attached to the bottom of the adaptor ring 295 by screws 298. The pressure ring 297 is adapted to fit within the rim flange R of the bowl to hold the same in alignment as it is pressed into the drop center portion of the rim. A leveling punch ring 299 surrounds the pressure ring adaptor 295 and abuts a backing ring 300. The punch ring 299 and its backing ring 300 are secured to stripper pins 301 which extend through the punch holder 278 and are secured at their upper ends to the stripper plate 293.

In operation, when the ram is in raised position the rim 289 is placed on the die ring 286 in the position shown and a locator pin 302 is praferably engaged in the valve hole of the ring to locate the rim radially with respect to the disk. A bowl F is then dropped within the rim, and is centered over the top of the pilot 280 and rests on the pad 279 in its upper position shown in phantom. As the ram descends, the leveling punch ring 299, held in advanced position by the stripper plate, engages the upper shoulder formed by the drop center portion of the rim and seats the rim on the die ring 286. Next, the pressure plate 290 bottoms on the flat hub portion of the bowl, and then the punch holder forces the pressure ring 297 within the rim flange R of the bowl and presses it within the inner surface of the drop center portion of the rim to the position shown in FIG. 25.

When the ram of the press is raised, the stripper plate 293, acting through stripper pins 292 and 301, holds the rim and wheel assembly down until the pressure ring 297 is stripped from the rim flange R, whereupon further upward movement of the ram strips the pressure plate 290 from the bowl F, and then raises the pressure plate and leveling punch ring 299 to allow the lower pressure pad 279 to rise and strip the assembly from the lower die ring 286.

Accordingly, the rim 289 is positively held in alignment at both the top and bottom thereof during the pressing operation, and at the same time the disk is independently held in positive alignment at its hub portion and at its rim flange.

Referring to FIG. 26, the lower die shoe 304 is supported on the bed of the press in a usual manner and has the usual guide pins 305 slidably engaged in the bushings 306 in the punch holder 307. The lower die pad 308 is supported on the die shoe 304 and has a centering pad 309 in its upper surface for engaging the hub hole of a bowl F resting on the pad 308. The centering pad is secured to the die shoe by a jack screw 310. Surrounding the pad 308 is a rim leveling ring 311 supported on a backing plate 312 splined to the pad by a key 313. A positioning die ring 314 is mounted in the retainer ring 311 and conforms to the intermediate curved portion of the bowl F. Surrounding the retainer ring 311 is a rim supporting ring 315 which is carried on cushioning pins 316 extending through the die shoe to a cushioning support 317 in the press. A locator pin 318 is mounted on a block 319 in the pad 308 for entering a bolt hole in the hub portion of the bowl F to hold the same against rotation. The left half of FIG. 26 shows the punch holder 307 raised to start the pressing operation, and the right half shows the punch holder 307 at the bottom of its stroke at the finish of the pressing operation.

The pundh 320 is carried in the punch holder 307 on a shaft 321 which is connected to a ram cushion member in the ram, and the punch is slidable within a retainer ring 322 secured to the punch holder by screws 323, the relative movement of the punch being limited by shoulders 324 and 325 on the punch and retainer ring, respectively. A pressure ring 326 is secured to the bottom of the punch, and has a rounded nose which is adapted to fit within the shoulder T of the bowl F when the punch bottoms, to hold the bowl in positive alignment.

In operation, the bowl F is placed in position on the pad 308 and positioning die ring 314, and the rim 327 with an inwardly offset portion 328 is centered on the top surface of diametrically opposed arms 329 extending inwardly from the rim support ring 315. The rim is positioned radially with respect to the disk by allowing pin 333 to engage valve slot 334. The pin 333 is carried in a block 335 mounted in a notch in the pressure ring 330. As the punch holder 307 is lowered, a rim pressure ring 330 supported on outer rim guide blocks 331 seats on the shoulder 332 of the rim and pushes the rim downwardly against the cushioning pressure of pins 316 to telescope the rim 327 over the rim flange of the bowl and seat the underside of rim shoulder 332 on the upper surface of the rim leveling ring 311.

When the punch holder 307 is raised, the supporting ring 315 urged upwardly by pins 316 engages the bottom edge of the rim and lifts the assembly off the leveling ring, and when the assembly reaches the position shown in the left half of FIG. 26, the pressure ring 326 urged by the ram cushion strips the ring 330 and blocks 331 from the rim.

*The welding operation*

Figure 8:
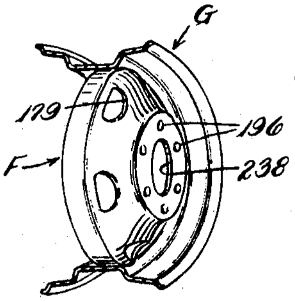
FIG. 8 is a perspective view showing the finished bowl pressed into a rim.

The assembly of the wheel and disk from the pressing operation shown in FIG. 25, for example, is indicated as a whole at G in FIGS. 8, 27 and 28. From the pressing operation the assemblies G may be conveyed by suitable means (not shown) to the welding apparatus shown in FIGS. 27 and 28.

The welding apparatus preferably comprises a frame, indicated generally at 338, having an inclined portion 339 on which brackets 340 are secured, and bearings 341 are mounted in the brackets and journal a trunnion shaft 342. A table frame 343 is pivoted on the trunnion shaft 342 and is adapted to lie in a vertical position, as shown in FIG. 27, when the apparatus is in position to receive or unload an assembly G. Frame members 344 extend outwardly at right angles to the frame 343 and support a face plate 345 in parallel relation to the frame members 344. Other frame members 346 extend parallel to the frame members 344 for a purpose to be described.

A table 347 is movably mounted on rack shafts 348 slidable in bearings 349 and 350 on the frame members 344 and 346, respectively, and the shafts 348 have gear rack sections meshing with gear wheels 351 on a rocker shaft 352 journaled at its ends in the outer portions of the frame members 346. The rocker shaft has an arm 353 thereon pivotally connected to the piston rod 354 of a fluid cylinder 355 mounted on one of the frame members 344. Accordingly, actuation of the piston rod 354 will reciprocate the rack shafts 348 and raise and lower the table 347, the lowered position being shown in phantom in FIG. 27 and in full lines in FIG. 28.

Between the rack shafts 348 is a drive shaft 356 journaled in suitable bearings (not shown) on the frame members 344 and 346, and the upper end of the shaft, as viewed in FIG. 27, is slidably keyed in the table 347. A drive gear 357 mounted on the shaft 356 is driven by gearing 358 from a mortor 359 supported on the frame 343.

A beveled locator finger 360 (best shown in FIG. 28) is mounted on the table 347 and is adapted to enter the hub hole 238 of the wheel F of the assembly G to center the assembly when the table is lowered. A clamping finger 362 is pivoted on the table at 363, and is adapted to enter and engage the edge of hub hole 238 when the table is lowered to clamp the assembly to the table for rotation therewith. A fluid cylinder 364 is mounted on the face plate 345 and its piston rod is pivotally connected to the opposite end of finger 362 for moving it into and out of clamping position.

A fluid cylinder 365 is mounted on the frame 338, and its piston rod is pivotally connected at 366 to the table frame 343 for swinging the table assembly bodily from the position of FIG. 27 to the position of FIG. 28 about the trunnion shaft 342 as a center. When the table is returned to the position of FIG. 27, it abuts an adjustable table stop 367 on the frame 338. In the raised position of the table shown in FIG. 28, the drive shaft 356 is horizontal and rotates the assembly G on a horizontal axis. In this position, the welding apparatus indicated as a whole at 368 in FIG. 28 is in proper relative position to weld the rim flange of the wheel F to the rim. The welding apparatus preferably comprises a welding head 369 adjustably mounted by adjusting shafts 370 and 371 on a frame member 372 which is vertically adjustably mounted on the frame 338.

The welding head 369 has feed roll means 373 for feeding the weld rod 374 through a curved conduit 375 to the torch zone indicated at 376. A tube 378 is directed into the torch zone which supplies inert gas to shield the welding arc.

In the operation of the welding apparatus, when an assembly G is placed on the table 347, the fluid cylinder 355 is activated to swing the arm 353 clockwise, as viewed in FIG. 27, and cause the rack shafts 348 to lower the table. When the clamping finger 362 enters the hub hole 238, the fluid cylinder 364 may be activated (by a limit switch on the rocker shaft 352, for example) to cause the finger 362 to clamp the hub portion of the wheel F. The lift cylinder 365 is then activated to swing the table assembly to the position of FIG. 28, placing the rim portion of wheel F in welding relation to the torch 376. When the table reaches this position, an arm 379 secured on the trunnion shaft 342 actuates a limit switch 380 on the frame 338, and the limit switch is electrically connected to the drive motor 359 and to the welding circuit, so that the torch is lighted and the wheel assembly starts to rotate simultaneously. When the assembly has rotated through a full revolution, a cyclic timer shuts off the torch and the drive motor 359 and deactivates the lift cylinder 365 to lower the table. When the table assembly reaches bottom against the stop 367, an arm 381 secured on the trunnion shaft 342 reverses the limit switch 380, causing the clamping finger 362 to disengage, and the rack shafts 348 to raise the table to the position of FIG. 27 to unload the welded assembly therefrom.

Figure 9:
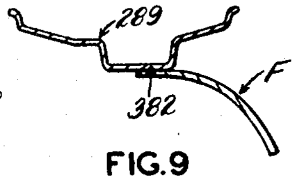
FIG. 9 is an enlarged fragmentary sectional view showing the bowl and rim welded together.

A preferred type of weld, which may be described as a "burn through weld," is shown in FIGS. 9 and 29 and may be accomplished by the foregoing operation. In this type of weld the torch is set to burn through the flange R of the bowl F and part way into the drop center portion of the rim 289. The weldment 382 is a continuous circumferential weldment spaced a substantial distance from the edge of the flange, so that it acts as a barrier to prevent elongation of any cracks starting in the edge of bowl flange R. This type of weld affords a maximum strength union of the wheel flange and rim continuously round the entire circumference of the disk and rim, as distinguished from spot welding, and provides a leakproof union for tubeless tire usage, as an advantage over the use of rivets, bolts, and the like.

FIG. 30 shows the same type of weld at 382' in a different rim and bowl assembly.

FIG. 31 shows an assembly of still different styles of rim and bowl, and also a different type of continuous weld which can be carried out by the aforesaid welding operation by employing a different shape of weld rod conduit. In this case the flange R' of the bowl F' is joined to the rim 383 by a continuous circumferential weldment 384 disposed in the annular groove formed between the flange R' and the rim 383, and penetrating into the walls of both the flange and the rim. The weld rod would be conducted around the outer edge of the rim to bring the torch into the annular groove.

FIG. 32 shows that the continuous weldment may also be applied between the rim 385 and the edge of the bowl flange R'' as indicated at 386, penetrating into both the bowl flange and the rim, as an alternative form for any of the above designs of rims or other types of rims to be attached to the bowl flange.

*Resumé*

The improved methods and apparatus herein described provide a revolutionary rapid and economical continuous operation adapted for automation for producing a lightweight disk wheel having optimum physical characteristics from a flat blank, and for producing a welded disk and rim assembly having extremely high resiliency and impact strength. The number of disk wheels produced per hour by the improved operation is increased many times over conventional practice.

As a result of the improved spinning operation, a minimum amount of die-forming of the metal is required, so that the metal of the disks is not unduly stressed. The improved disk has the desired bowl shape with a curved perforate intermediate portion tapering in thickness out to a relatively thin rim flange, giving maximum strength and resiliency with minimum weight.

Also as a result of the accurate spinning and die-forming of the wheel disk or bowl, the rim and wheel assembly produced thereby is found to have far greater accuracy in circumferential and diametrical size and far greater accuracy in concentricity of the tire bead seats of the rim with respect to the axis of the wheel, and far greater accuracy in the disposition of the central plane of the rim at right angles to the axis of the wheel. The accuracy of the wheel in these three respects is such that the tolerances of manufacture can be reduced from ¼ to ½ the tolerances required in prior art types of wheel and rim assembly production.

What is claimed is:

1. In a method of making a wheel disk having a curved bowl shape uniformly and gradually tapering from a relatively thick flat hub portion to a relatively thin rim flange, the steps of cold spinning a flat circular axially perforate blank into a curved bowl of said tapering thickness by axially displacing successive elements of the blank from the hub portion radially outwardly while maintaining the outer diameter of the blank constant, and afterwards die-forming the spun bowl to provide a cylindrical rim flange and an annular shoulder between said rim flange and said hub portion.

2. In a method of making a wheel disk having a curved bowl shape uniformly and gradually tapering from a relatively thick flat hub portion to a relatively thin rim flange, the steps of punching from a plate a flat circular axially perforate blank, machining the edge of the blank, cold spinning the blank into a curved bowl of said tapering thickness by axially displacing successive elements of the blank from the hub portion radially outwardly while maintaining the outer diameter of the blank substantially constant, and die-forming the spun bowl to provide a cylindrical rim flange and an annular shoulder between said rim flange and said hub portion.

3. The method of making a wheel disk having a curved bowl shape uniformly and gradually tapering from a relatively thick flat hub portion to a relatively thin rim flange, comprising punching from a plate a flat circular axially perforate blank, machining the edge of the blank, cold spinning the blank into a curved bowl of said tapering thickness by axially displacing successive elements of the blank from the hub portion radially outwardly while maintaining the outer diameter of the blank substantially constant, die-forming the spun bowl to provide a cylindrical rim flange and an annular shoulder between said rim flange and said hub portion, piercing bolt holes and an axial hub hole in said hub portion and hand holes in the curved portion between said hub portion and rim flange, coining the edges of said hand holes, and machining said bolt holes and axial hub hole while maintaining the concentricity of said axial hub hole and said cylindrical rim flange.

References Cited

UNITED STATES PATENTS

| | | | |
|---|---|---|---|
| 1,897,646 | 2/1933 | Swanson | 29—159.01 |
| 2,406,062 | 8/1946 | Cornell | 29—159.01 |
| 3,114,342 | 12/1963 | Sporck et al. | 72—83 |

THOMAS H. EAGER, *Primary Examiner.*